(12) United States Patent
Wada et al.

(10) Patent No.: US 12,039,065 B2
(45) Date of Patent: Jul. 16, 2024

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventors: Hiroho Wada, Yokohama Kanagawa (JP); Naoki Ogura, Yokohama Kanagawa (JP); Yoshikazu Hanatani, Komae Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 528 days.

(21) Appl. No.: 17/005,473

(22) Filed: Aug. 28, 2020

(65) Prior Publication Data

US 2021/0097192 A1  Apr. 1, 2021

(30) Foreign Application Priority Data

Oct. 1, 2019  (JP) .................................. 2019-181113

(51) Int. Cl.
*G06F 21/62*   (2013.01)
*G06F 16/25*   (2019.01)
*G06F 16/28*   (2019.01)

(52) U.S. Cl.
CPC ........ *G06F 21/6218* (2013.01); *G06F 16/258* (2019.01); *G06F 16/285* (2019.01)

(58) Field of Classification Search
CPC .. G06F 21/6218; G06F 16/258; G06F 16/285; G06F 21/6254; G06F 16/27
See application file for complete search history.

(56) References Cited

U.S. PATENT DOCUMENTS

| | | | |
|---|---|---|---|
| 6,654,466 B1* | 11/2003 | Ikefuji | G06K 19/0723 380/255 |
| 6,957,349 B1 | 10/2005 | Yasukura | |
| 10,063,590 B1* | 8/2018 | Sharifi Mehr | H04L 63/205 |
| 2004/0034712 A1* | 2/2004 | Rajwan | H04L 65/611 709/231 |
| 2016/0203334 A1 | 7/2016 | Fawaz et al. | |
| 2016/0205174 A1* | 7/2016 | Pitio | H04L 47/283 709/201 |

FOREIGN PATENT DOCUMENTS

| | | |
|---|---|---|
| JP | 2016-535898 A | 11/2016 |
| WO | WO 00/45358 A1 | 8/2000 |
| WO | WO 2013/121738 A1 | 8/2013 |

* cited by examiner

*Primary Examiner* — Fatoumata Traore
*Assistant Examiner* — Carlton Johnson
(74) *Attorney, Agent, or Firm* — Finnegan, Henderson, Farabow, Garrett & Dunner, LLP

(57) ABSTRACT

An information processing apparatus according to an embodiment includes one or more hardware processor. The one or more hardware processor divides original data into a plurality of pieces of division data, each piece of the division data including a non-overlap with one another, and executes alteration processing in mutually different manners on the plurality of pieces of division data, the mutually different manners corresponding one-to-one to the plurality of pieces of division data.

13 Claims, 14 Drawing Sheets

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-181113, filed on Oct. 1, 2019; the entire contents of which are incorporated herein by reference.

FIELD

Embodiments described herein relate generally to an information processing apparatus, an information processing method, and a computer program product.

BACKGROUND

Requests for analysis of original data are submitted to analysis institutions. When requesting the analysis, in order to maintain confidentiality of the original data, the original data is divided into a plurality of pieces of data, and only part of the plurality of pieces of data is disclosed to each of the analysis institutions.

However, conventionally, it has been possible to restore the original data by collusion between the analysis institutions to combine data disclosed to each analysis institution. Therefore, conventionally, it has been difficult to inhibit the leakage of confidentiality.

DETAILED DESCRIPTION

An information processing apparatus according to an embodiment includes one or more hardware processor configured to: divide original data into a plurality of pieces of division data, each piece of the division data including a non-overlap with one another, and execute alteration processing in mutually different manners on the plurality of pieces of division data, the mutually different manners corresponding one-to-one to the plurality of pieces of division data.

An information processing apparatus, an information processing method, and a computer program product will be described in detail below with reference to the accompanying drawings.

Figure 1:
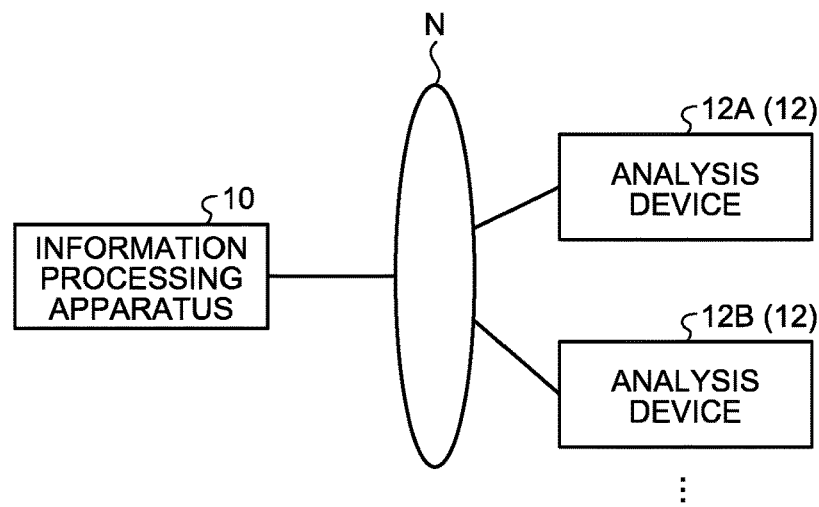
FIG. 1 schematically illustrates an information processing system according to an embodiment.

FIG. 1 schematically illustrates an example of an information processing system 1 of the present embodiment.

The information processing system 1 includes an information processing apparatus 10 and a plurality of analysis devices 12. The information processing apparatus 10 and each of the plurality of analysis devices 12 are communicably connected via a wireless or wired communication network such as a network N.

The information processing apparatus 10 is a dedicated computer or a general-purpose computer. The information processing apparatus 10 requests analysis of original data to each of the plurality of analysis devices 12. Details of the original data will be described below.

Each analysis device 12 is a dedicated or general-purpose computer. Each analysis device 12 analyzes data received from the information processing apparatus 10.

In the present embodiment, there will be exemplarily described that the information processing system 1 includes two analysis devices 12 (analysis device 12A and analysis device 12B). Each of the plurality of analysis devices 12 is managed differently by an enterprise, individual, or entity. In the present embodiment, as an example, description will be given with assuming that the analysis device 12A is managed by a company B and the analysis device 12B is managed by a company C. The company B and the company C are examples of enterprises. Note that it is sufficient that the information processing system 1 includes a plurality of analysis devices 12, and thus may include three or more analysis devices 12.

Figure 2:
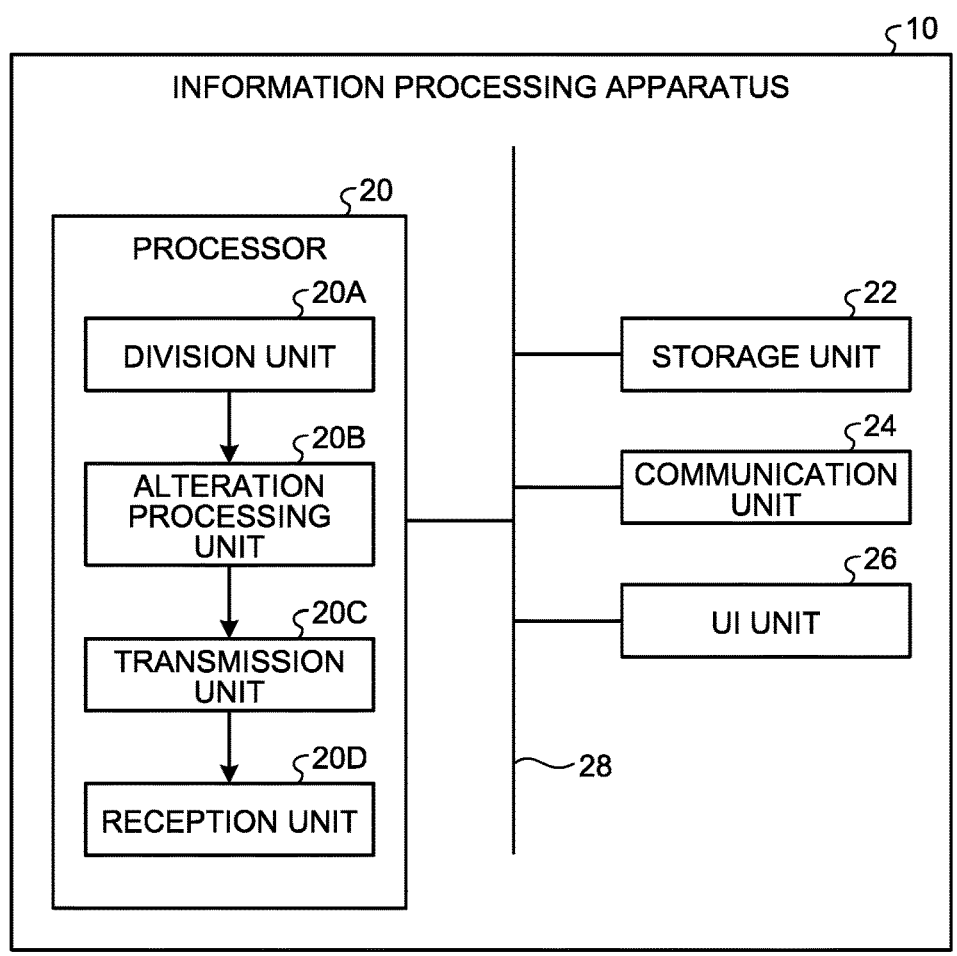
FIG. 2 is a block diagram of a functional configuration of an information processing apparatus according to the embodiment.

FIG. 2 is a block diagram of an exemplary functional configuration of the information processing apparatus 10.

The information processing apparatus 10 includes a processor 20, a storage unit 22, a communication unit 24, and a user interface (UI) unit 26. The processor 20, the storage unit 22, the communication unit 24, and the UI unit 26 are connected via a bus 28 so as to exchange data or signals.

Note that one or more of the storage unit 22, the communication unit 24, and the UI unit 26, and the processor 20 may be connected over the network N. That is, one or more of the storage unit 22, the communication unit 24, and the UI unit 26 may be provided with an external apparatus connected to the information processing apparatus 10 via the network N. Furthermore, one or more of functional units to be described below included in the processor 20 may be provided with the external apparatus. The external apparatus is, for example, an external server.

The storage unit 22 stores various types of data. The storage unit 22 is, for example, a random-access memory (RAM), a semiconductor memory element such as a flash memory, a hard disk, an optical disk, or the like. Note that the storage unit 22 may be a storage device provided outside the information processing apparatus 10. Alternatively, the storage unit 22 may be a storage medium. Specifically, the storage medium may be one in which programs and various types of information are downloaded, and stored or temporarily stored, via a local area network (LAN), the Internet, or the like. Alternatively, the storage unit 22 may include a plurality of storage media.

The communication unit 24 communicates with each of the plurality of analysis devices 12 and the external apparatus via the network N. For example, the communication unit 24 transmits various types of information to the analysis devices 12 or receives various types of information from the analysis devices 12.

The UI unit 26 has a function of receiving an operation input by the user, and a function of outputting various types of information.

For example, the UI unit 26 includes a display and an input unit. The display displays various types of information. The display is, for example, a known organic electroluminescence (EL) display, liquid crystal display (LCD), projection device, or the like. The input unit receives various types of instructions from the user. An input unit is, for example, a keyboard, a mouse, a touch panel, a microphone, or the like. Note that the UI unit 26 may include a touch panel provided with an input mechanism and an output mechanism. In addition, the UI unit 26 may further include a speaker that outputs sound.

The processor 20 includes a division unit 20A, an alteration processing unit 20B, a transmission unit 20C, and a reception unit 20D. One or more of the division unit 20A, the alteration processing unit 20B, the transmission unit 20C, and the reception unit 20D is achieved by, for example, one or a plurality of processors. For example, each of the above units may be achieved by causing a processor such as a central processing unit (CPU) to execute a program, that is, by software. Each of the above units may be achieved by a processor such as a dedicated integrated circuit (IC), that is, by hardware. Each of the above units may be achieved by the combined use of software and hardware. When a plurality of processors is used, each processor may achieve one of the units or may achieve two or more of the units.

The division unit 20A divides the original data into a plurality of pieces of division data.

The original data refers to analysis target data. In other words, the original data is data that is original of a target for which analysis request is submitted to each of the plurality of analysis devices 12.

Figure 3:
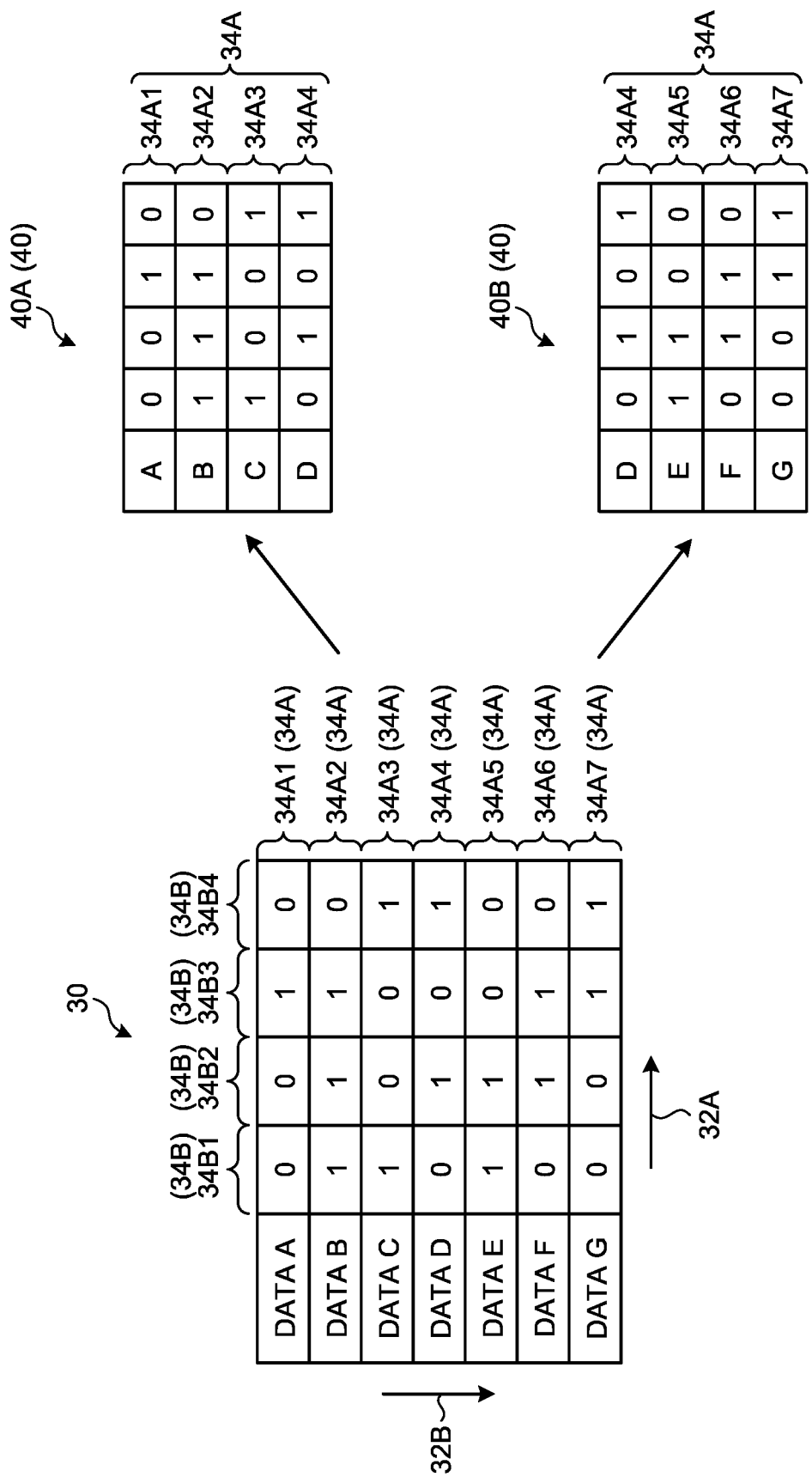
FIG. 3 explanatorily illustrates original data and division data according to the embodiment.

FIG. 3 explanatorily illustrates an example of original data 30 and division data 40. The original data 30 is a group of pieces of binary data. FIG. 3 illustrates, as an example, a case where the original data 30 is a group of pieces of binary data including binary data of "0" or "1". However, the original data 30 is not limited to the binary data.

The original data 30 includes a plurality of first data groups 34A, each including a group of pieces of binary data arrayed in a line in a first direction 32A. The plurality of first data groups 34A are arrayed in a second direction 32B. The second direction 32B is a direction intersecting with the first direction 32A.

Each first data group 34A is treated as a unit of analysis target data.

The analysis target is, for example, an article to be analyzed. The article is, for example, but not limited to, an electric appliance, a vehicle, or a component mounted on an electric appliance or a vehicle. The component is, for example, but not limited to, an electronic circuit, a silicon wafer, or the like. Note that the analysis target is not limited to the article, and may be a group of data classified in accordance with a predetermined classification rule. In the present embodiment, the description will be given with assuming that the analysis target is an article.

The analysis target data is various types of data obtained from the analysis target, and is expressed by binary data. For example, the analysis target data is an inspection result of each analysis target region. Specifically, for example, the analysis target data is data in which "1" representing that the inspection result is good and "0" representing that the inspection result is poor are defined for each analysis target region.

In the present embodiment, there will be exemplarily described a case where one first data group 34A is a group of pieces of binary data, each piece of binary data representing an inspection result of each region in one article. Thus, the description will be given with assuming that the original data 30 is a group of data including first data groups 34A each of which is the inspection result of each of a plurality of articles, the first data groups 34A being arrayed in the second direction 32B.

As an example, FIG. 3 illustrates the original data 30 including the first data groups 34A (34A1 to 34A7) representing one-to-one seven articles of data A to data G, the first data groups 34A being arrayed in the second direction 32B. Note that it is sufficient that the number of first data groups 34A included in the original data 30 is two or more, and thus is not limited to seven.

As described above, each of the first data group 34A is the group of pieces of binary data arrayed in a line in the first direction 32A in the original data 30. In contrast to the first data group 34A, a group of pieces of binary data arrayed in a line in the second direction 32B in the original data 30 will be described as a second data group 34B. As an example, FIG. 3 exemplarily illustrates a case where the original data 30 includes four second data groups 34B (second data group 34B1 to second data group 34B4) arrayed in the first direction 32A). However, it is sufficient that the number of second data groups 34B included in the original data 30, that is, the number of pieces of binary data included in the first data group 34A is two or more, and thus is not limited to four.

Referring back to FIG. 2, the description will be continued. The division unit 20A divides the original data 30 into a plurality of pieces of division data 40, each piece of the division data 40 including a non-overlap with one another. The non-overlap refers to part of one piece of the division data 40, which does not overlap with another piece of the division data 40. The division unit 20A divides the original data 30 into the pieces of division data 40 corresponding to the number of analysis devices 12 to which analysis is requested. It is sufficient that the number of analysis devices 12 to which the analysis is requested is stored in advance in the storage unit 22. Furthermore, the number of analysis devices 12 to which the analysis is requested may be appropriately changed in response to, for example, an operation instruction from the UI unit 26 by the user. The division unit 20A divides the original data 30 into the pieces of division data 40 corresponding to the number of analysis devices 12 to which the analysis is requested, the number of analysis devices 12 having been stored in the storage unit 22.

In the present embodiment, the description will be given with assuming that the information processing apparatus 10 requests the analysis to two analysis devices 12 (analysis device 12A and analysis device 12B). Thus, the description will be given with assuming that the division unit 20A divides the original data 30 into two pieces of division data 40.

The division unit 20A divides the original data 30 into the plurality of pieces of division data 40 such that each piece of the division data 40 includes a non-overlap with one another.

As illustrated in FIG. 3, the division unit 20A divides the original data 30 into: division data 40A including the first data group 34A1 to the first data group 34A4; and division data 40B including the first data group 34A4 to the first data group 34A7.

Referring back to FIG. 2, the description will be continued. The alteration processing unit 20B executes alteration processing in mutually different manners on the plurality of pieces of division data 40 (division data 40A and division data 40B). The mutually different manners correspond one-to-one to the plurality of pieces of division data 40.

The transmission unit 20C outputs, to the corresponding analysis device 12, each pieces of altered data that is the piece of division data 40 on which the alteration processing has been executed. The analysis device 12 analyzes the altered data received from the information processing apparatus 10, and then transmits the analysis result to the information processing apparatus 10. The reception unit 20D receives the analysis result from each of the plurality of analysis devices 12. The analysis result represents, for example, the appearance frequency of a value (binary value) for each position in the first direction 32A and the second direction 32B.

Here, a conventional analysis request method will be described.

Figure 4:
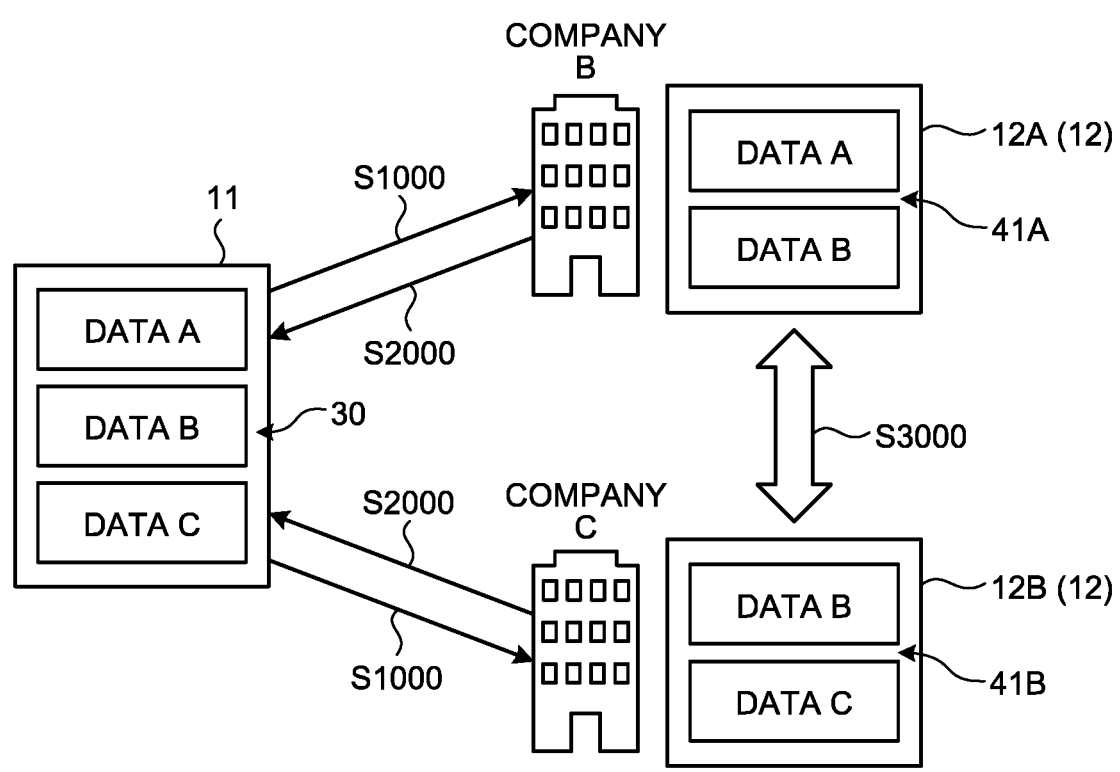
FIG. 4 explanatorily illustrates a conventional analysis request method.

FIG. 4 schematically illustrates an example of the conventional analysis request method. A conventional information processing apparatus 11, for example, divides original data 30 including data A to data C into division data 41A including the data A and the data B, and division data 41B including the data B and the data C. Then, the conventional information processing apparatus 11 transmits the division data 41A to an analysis device 12A owned by a company B, and transmits the division data 41B to the analysis device 12B owned by a company C (Step S1000). The analysis device 12A and the analysis device 12B, respectively, analyze the division data 41A and the division data 41B received from the information processing apparatus 11. Then, the analysis device 12A and the analysis device 12B each transmit the analysis result to the information processing apparatus 11 (Step S2000).

However, with such a conventional analysis request method, in a case where the company B managing the analysis device 12A and the company C managing the analysis device 12B have colluded with each other (Step S3000), it has been possible to restore the original data 30 by combining the division data 41A and the division data 41B. Thus, it has been difficult in the conventional technique to inhibit the leakage of confidentiality in some cases.

Considering the above difficulty, the information processing apparatus 10 of the present embodiment includes the alteration processing unit 20B. The alteration processing unit 20B executes the alteration processing in the mutually different manners on the plurality of pieces of division data 40, the mutually different manners corresponding one-to-one to the plurality of pieces of division data 40.

Figure 5:
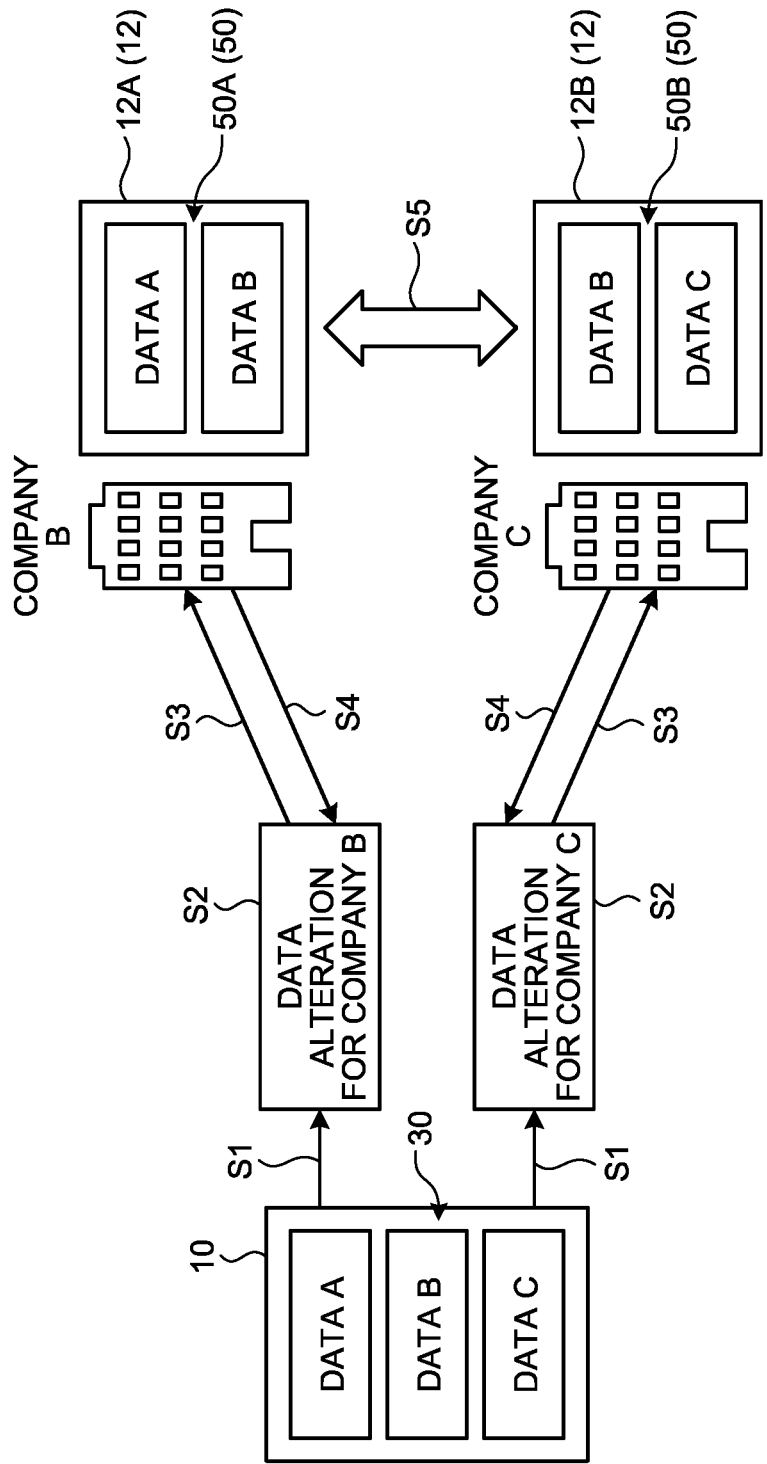
FIG. 5 explanatorily illustrates an alteration request method that is executed by the information processing apparatus according to the embodiment.

FIG. 5 explanatorily illustrates an alteration request method that is executed by the information processing apparatus 10 of the present embodiment. In the present embodiment, the alteration processing unit 20B executes alteration processing in mutually different manners on the plurality of pieces of division data 40 (division data 40A and division data 40B). The plurality of pieces of division data 40 is divided one-to-one for the plurality of analysis devices 12 by the division unit 20A (Step S1), and the mutually different manners correspond one-to-one to the plurality of pieces of division data 40 (Step S2). Then, the information processing apparatus 10 transmits altered data 50A and altered data 50B obtained by the alteration processing in the mutually different manners to the analysis device 12A and the analysis device 12B, respectively (Step S3). The analysis device 12A and the analysis device 12B, respectively, analyze the altered data 50A and the altered data 50B received from the information processing apparatus 10. Then, the analysis device 12A and the analysis device 12B each transmit the analysis result to the information processing apparatus 10 (Step S4).

Here, it is assumed that the company B managing the analysis device 12A and the company C managing the analysis device 12B have colluded with each other and combined the altered data 50A and the altered data 50B (Step S5). However, as described above, the altered data 50A and the altered data 50B have been subjected to the alteration processing in the mutually different manners. Thus, the company B and the company C are difficult to restore the original data 30, and the information processing apparatus 10 of the present embodiment can inhibit the leakage of confidentiality.

Referring back to FIG. 2, the alteration processing by the alteration processing unit 20B will be described in detail.

The alteration processing unit 20B executes the alteration processing individually on at least either the first data groups 34A or the second data groups 34B in each of the plurality of pieces of division data 40.

Specifically, the alteration processing unit 20B executes, as the alteration processing, one or more of first replacement processing, second replacement processing, first inversion processing, second inversion processing, third inversion processing, fourth inversion processing, and thinning processing.

First Replacement Processing

First of all, first replacement processing will be described. The first replacement processing involves replacing the positions in the first direction 32A of two or more second data groups 34B included in each piece of division data 40.

Figure 6:
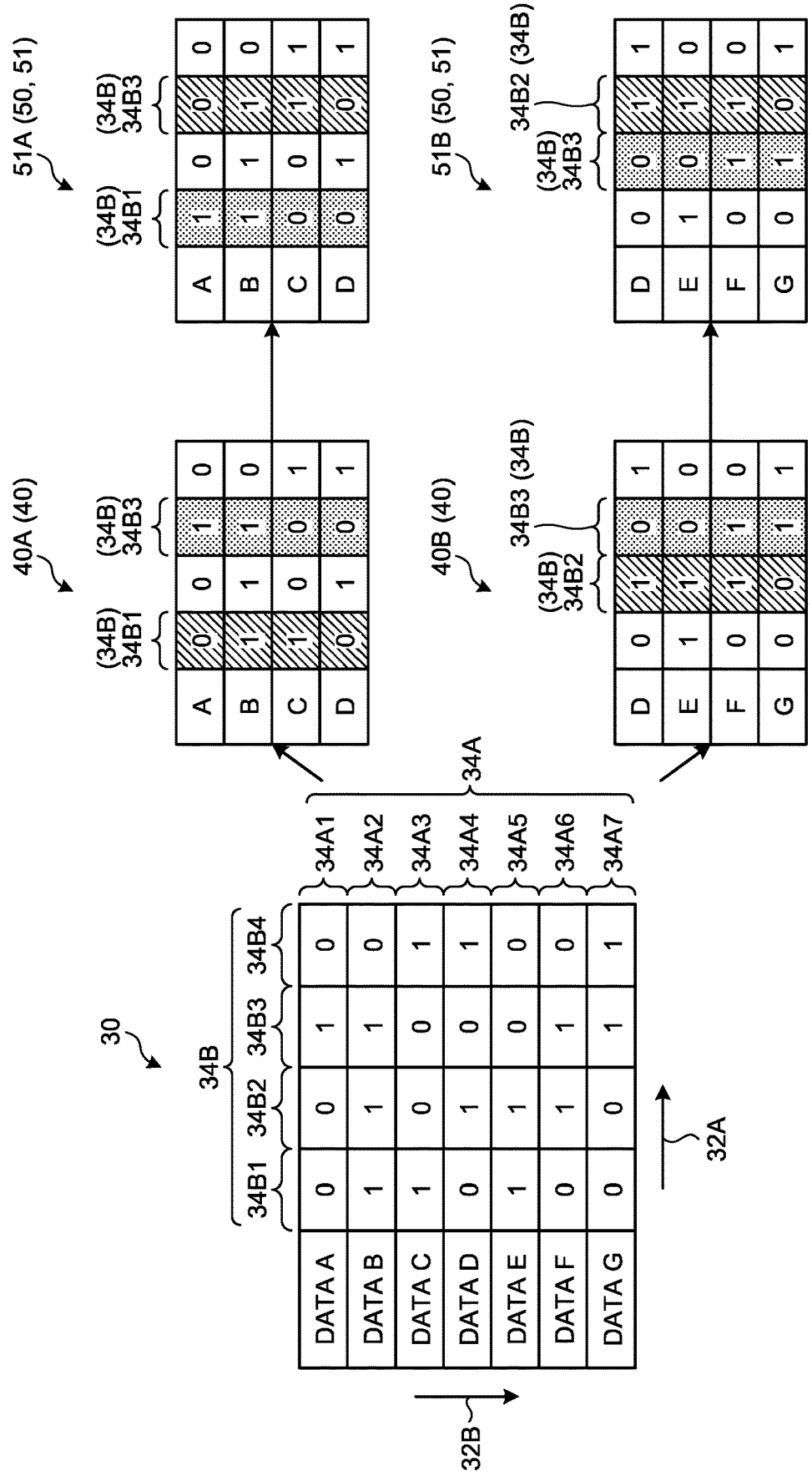
FIG. 6 explanatorily illustrates first replacement processing according to the embodiment.

FIG. 6 explanatorily illustrates an example of the first replacement processing. The alteration processing unit 20B selects the second data groups 34B that are replacement targets, in each of the division data 40A and the division data 40B. At this time, the alteration processing unit 20B selects, as the replacement targets, the second data groups 34B of which one or more of the positions in the first direction 32A is different between the division data 40A and the division data 40B. The alteration processing unit 20B selects each second data group 34B that is the replacement target, with a numerical value output from a random number generator or the like.

For example, the alteration processing unit 20B selects, as the replacement targets, the second data groups 34B (second data group 34B1 and second data group 34B3) on the first and third columns in the division data 40A, as illustrated in FIG. 6. Note that "N" of the N-th column (N is an integer of 1 or more) is a numerical value representing the position in the first direction 32A of each piece of division data 40. The "N" takes "1" at the position of the binary data located at the most upstream end in the first direction 32A. The "N"

indicates a number incremented by one at each position of the binary data toward downstream in the first direction 32A.

The alteration processing unit 20B replaces the positions in the first direction 32A for the selected second data group 34B1 and second data group 34B3. With this replacement processing, the alteration processing unit 20B generates altered data 51A from the division data 40A. The altered data 51A is an example of altered data 50 obtained by executing the alteration processing on the division data 40A.

Furthermore, the alteration processing unit 20B selects, as the replacement targets, the second data groups 34B (second data group 34B2 and second data group 34B3) on the second and third columns in the division data 40B, as illustrated in FIG. 6. Then, the alteration processing unit 20B replaces the positions in the first direction 32A for the selected second data group 34B2 and second data group 34B3. With this replacement processing, the alteration processing unit 20B generates altered data 51B from the division data 40B. The altered data 51B is an example of altered data 50 obtained by executing the alteration processing on the division data 40B.

The transmission unit 20C transmits the altered data 51A and the altered data 51B obtained by the alteration processing, to the analysis device 12A and the analysis device 12B, respectively. Each of the analysis device 12A and the analysis device 12B analyzes the altered data 51 received from the information processing apparatus 10, and transmits the analysis result to the information processing apparatus 10.

Here, it is assumed that the company B managing the analysis device 12A and the company C managing the analysis device 12B have colluded with each other and combined the altered data 51A and the altered data 51B. However, the altered data 51A and the altered data 51B have been subjected to the alteration processing in the mutually different manners. That is, the altered data 51A and the altered data 51B are different from each other in one or more of the positions in the first direction 32A of the second data groups 34B that are the replacement targets, between the pieces of division data 40. Thus, the company B and the company C are difficult to restore the original data 30 from the altered data 51A and the altered data 51B. Therefore, the information processing apparatus 10 can inhibit the leakage of confidentiality.

Second Replacement Processing

Next, second replacement processing will be described. The second replacement processing involves replacing the positions in the second direction 32B of two or more first data groups 34A included in each piece of division data 40.

Figure 7:
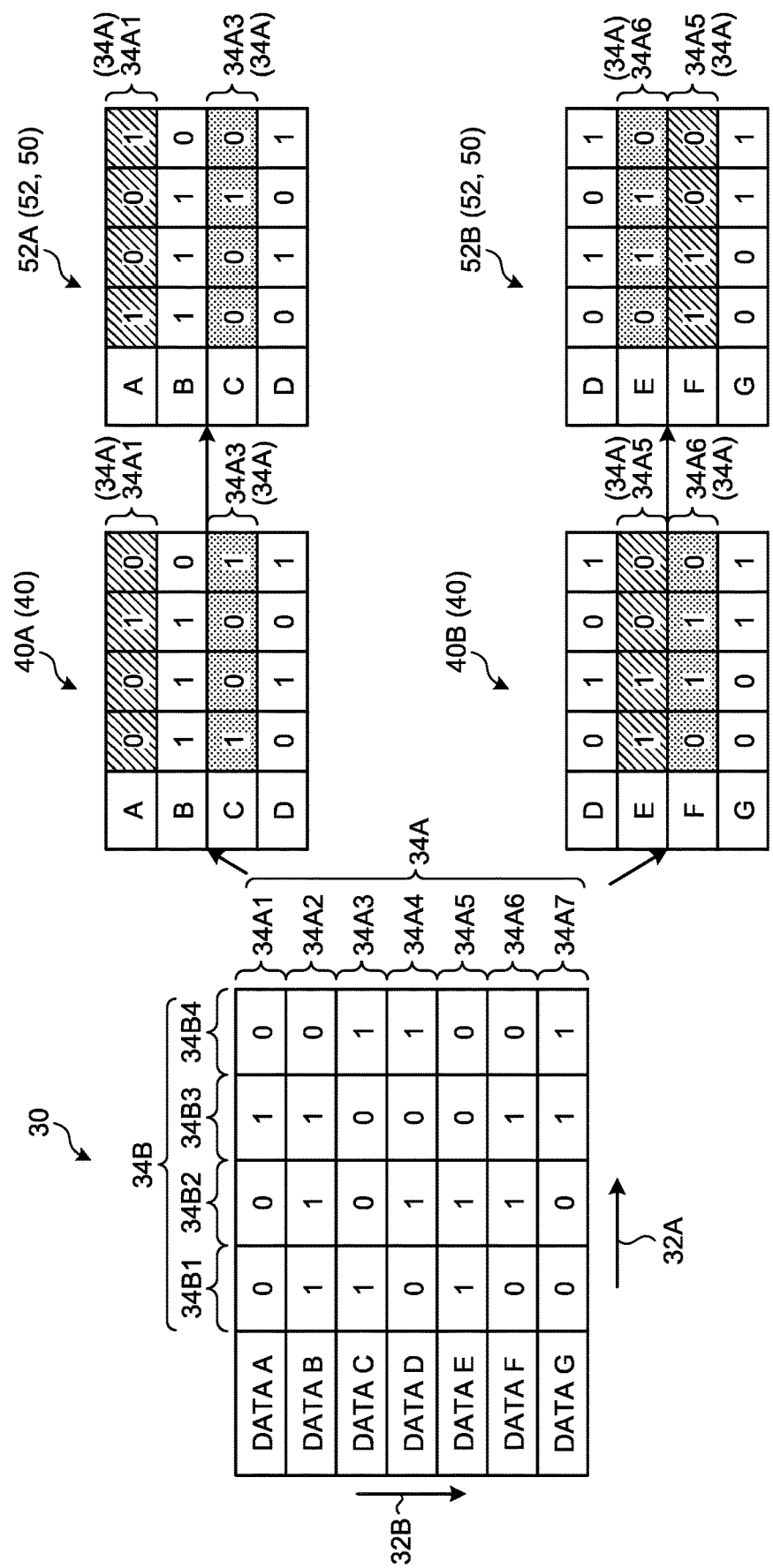
FIG. 7 explanatorily illustrates second replacement processing according to the embodiment.

FIG. 7 explanatorily illustrates an example of the second replacement processing. The alteration processing unit 20B selects the first data groups 34A that are replacement targets, in each of the division data 40A and the division data 40B. At this time, the alteration processing unit 20B selects, as the replacement targets, the first data groups 34A of which one or more of the positions in the second direction 32B is different between the division data 40A and the division data 40B. The alteration processing unit 20B selects each first data group 34A, which is the replacement target, by using a numerical value output from the random number generator or the like.

For example, the alteration processing unit 20B selects, as the replacement targets, the first data groups 34A (first data group 34A1 and first data group 34A3) on the first and third rows in the division data 40A, as illustrated in FIG. 7. Note that "M" of the M-th row (M is an integer of 1 or more) is a numerical value representing the position in the second direction 32B of each piece of division data 40. The "M" takes "1" at the position of the binary data located at the most upstream end in the second direction 32B. The "M" indicates a number incremented by one at each position of the binary data toward downstream in the second direction 32B.

Then, the alteration processing unit 20B replaces the positions in the second direction 32B for the selected first data group 34A1 and first data group 34A3. With this replacement processing, the alteration processing unit 20B generates altered data 52A from the division data 40A. The altered data 52A is an example of altered data 50 obtained by executing the alteration processing on the division data 40A.

Furthermore, the alteration processing unit 20B selects, as the replacement targets, the first data groups 34A (first data group 34A5 and first data group 34A6) on the second and third rows in the division data 40B, as illustrated in FIG. 7. Then, the alteration processing unit 20B replaces the positions in the second direction 32B for the selected first data group 34A5 and first data group 34A6. With this replacement processing, the alteration processing unit 20B generates altered data 52B from the division data 40B. The altered data 52B is an example of altered data 50 obtained by executing the alteration processing on the division data 40B.

The transmission unit 20C transmits the altered data 52A and the altered data 52B obtained by the alteration processing, to the analysis device 12A and the analysis device 12B, respectively. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combined the altered data 52A and the altered data 52B. However, the altered data 52A and the altered data 52B have been subjected to the alteration processing in the mutually different manners. That is, the altered data 52A and the altered data 52B are different from each other in one or more of the positions in the second direction 32B of the first data groups 34A that are the replacement targets, between the pieces of division data 40. Thus, the company B and the company C are difficult to restore the original data 30 from the altered data 52A and the altered data 52B. Therefore, the information processing apparatus 10 can inhibit the leakage of confidentiality.

Note that, in a case where the alteration processing unit 20B has executed, as the alteration processing, one or more of the first replacement processing and the second replacement processing, the analysis result obtained from each analysis device 12 becomes the same value as the analysis result of the corresponding division data 40. Therefore, in this case, the information processing apparatus 10 can achieve both inhibition of the leakage of confidentiality and inhibition of the deterioration in accuracy of the analysis results.

It is assumed that each analysis device 12 analyzes the corresponding altered data 50 by using hierarchical clustering or non-hierarchical clustering.

Figure 8:
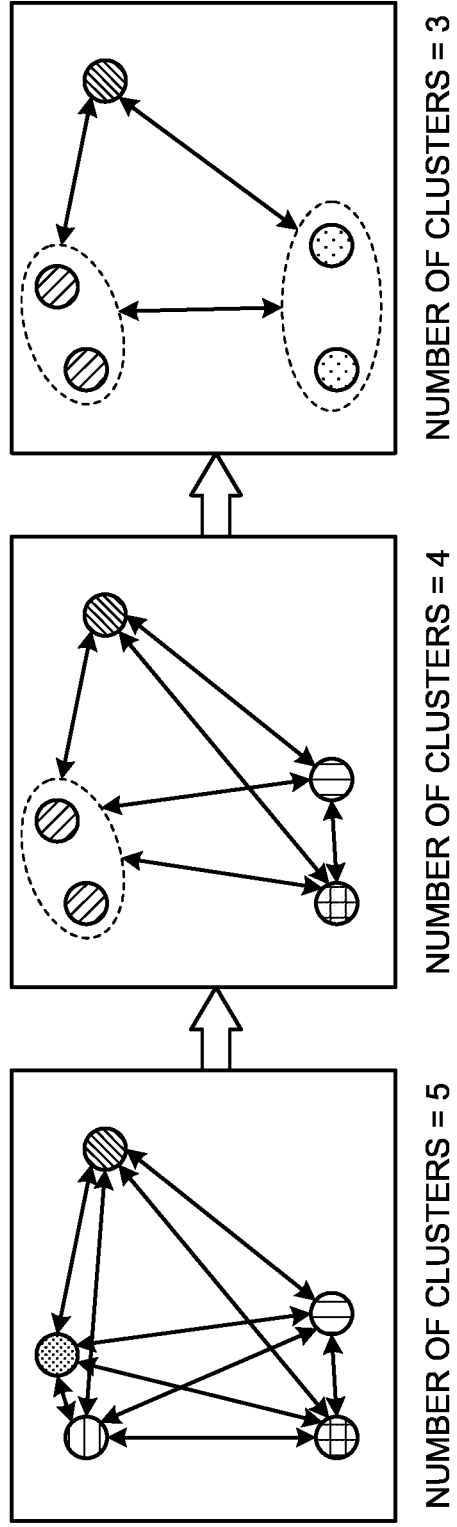
FIG. 8 explanatorily illustrates analysis by an analysis device according to the embodiment.

FIG. 8 explanatorily illustrates an example of the analysis by the analysis device 12. It is assumed that the analysis device 12 analyzes the corresponding altered data 50 by using, for example, agglomerative clustering that is an example of the hierarchical clustering.

The aggregative clustering is a clustering method in which clusters close in distance are aggregated, as illustrated in FIG. 8.

Figure 9:
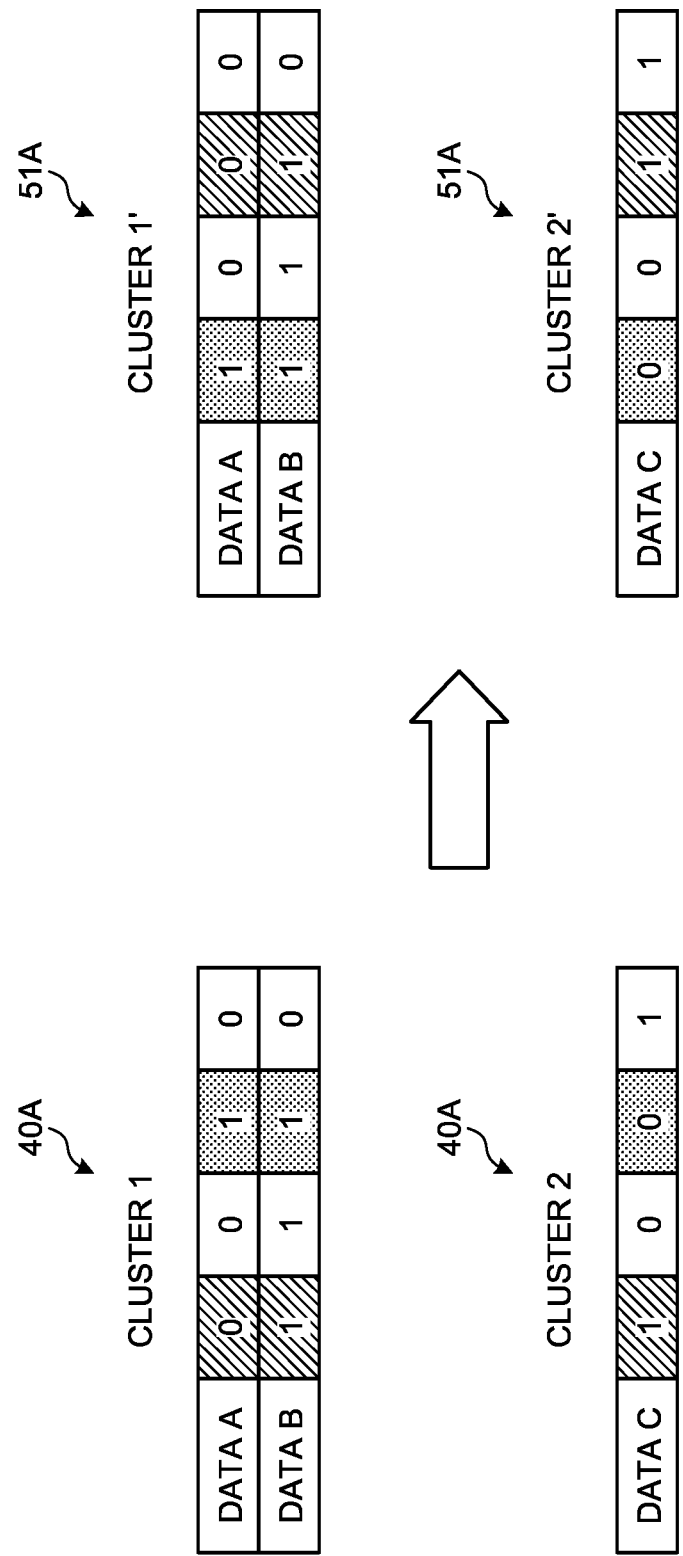
FIG. 9 explanatorily illustrates a clustering result according to the embodiment.

FIG. 9 explanatorily illustrates an example of the clustering result. For example, the center of gravity $m_1$ of the cluster 1 of the data A and the data B included in the division data 40A is expressed by Expression (1) below. Furthermore, the center of gravity $m_2$ of the cluster 2 of the data C included in the division data 40A is expressed by Expression (2) below. Still furthermore, the distance $d(m_1, m_2)^2$ between the cluster 1 and the cluster 2 in the division data 40A is expressed by Expression (3) below.

$$m_1 = \left(\frac{1}{2}, \frac{1}{2}, 1, 0\right) \quad (1)$$

$$m_2 = (1, 0, 0, 1) \quad (2)$$

$$d(m_1, m_2)^2 = \left(1 - \frac{1}{2}\right)^2 + \left(0 - \frac{1}{2}\right)^2 + (0-1)^2 + (1-0)^2 = \frac{5}{2} \quad (3)$$

Meanwhile, the center of gravity $m_1'$ of the cluster 1' of the data A and the data B included in the altered data 51A is expressed by Expression (4) below. Furthermore, the center of gravity $m_2'$ of the cluster 2' of the data C included in the altered data 51A is expressed by Expression (5) below. Still furthermore, the distance $d(m_1', m_2')^2$ between the cluster 1' and the cluster 2' in the altered data 51A is expressed by Expression (6) below.

$$m_1' = \left(1, \frac{1}{2}, \frac{1}{2}, 0\right) \quad (4)$$

$$m_2' = (0, 0, 1, 1) \quad (5)$$

$$d(m_1', m_2')^2 = (0-1)^2 + \left(0 - \frac{1}{2}\right)^2 + \left(1 - \frac{1}{2}\right)^2 + (1-0)^2 = \frac{5}{2} \quad (6)$$

As shown in Expression (3) and Expression (6), the same value can be obtained from: the distance $d(m_1, m_2)^2$ between the cluster 1 and the cluster 2 calculated on the division data 40A; and the distance $d(m_1', m_2')^2$ between the cluster 1' and the cluster 2' calculated on the altered data 51A. Therefore, the analysis result obtained from the division data 40 and the analysis result obtained from the altered data 51 become the same analysis result.

A similar result can be obtained in a case where the altered data 50 generated by the first replacement processing is used instead of the altered data 51 generated by the second replacement processing.

Thus, in a case where the alteration processing unit 20B has executed, as the alteration processing, one or more of the first replacement processing and the second replacement processing, the analysis result obtained from each analysis device 12 becomes the same value as the analysis result of the corresponding division data 40. Therefore, in this case, the information processing apparatus 10 can achieve both inhibition of the leakage of confidentiality and inhibition of the deterioration in accuracy of the analysis results.

First Inversion Processing

Next, first inversion processing will be described. The first inversion processing involves inverting the respective values of the pieces of binary data of at least one second data group 34B included in each piece of division data 40.

Figure 10:
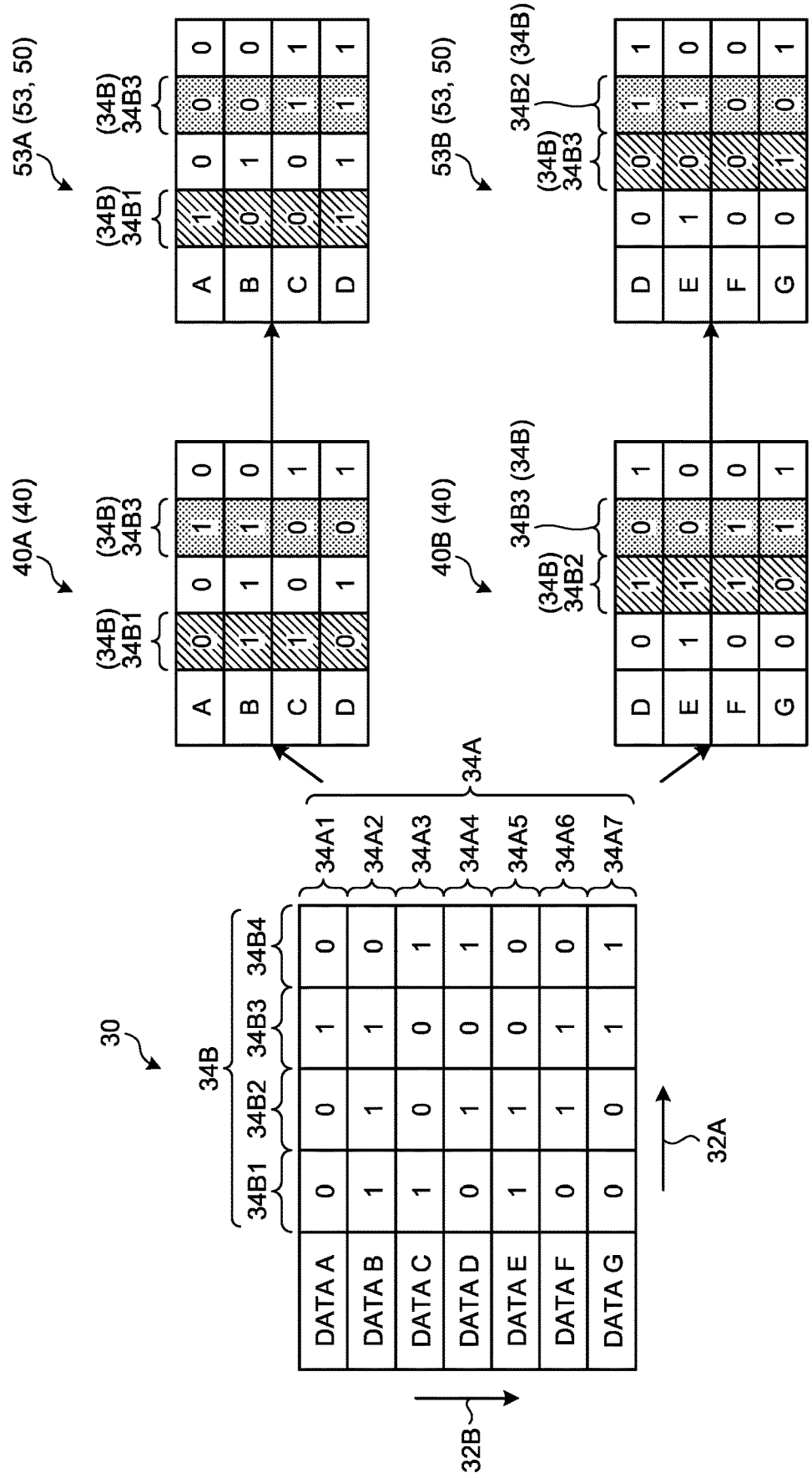
FIG. 10 explanatorily illustrates first inversion processing according to the embodiment.

FIG. 10 explanatorily illustrates an example of the first inversion processing. The alteration processing unit 20B selects a second data group 34B as an inversion target, in each of the division data 40A and the division data 40B. At this time, the alteration processing unit 20B selects one or more second data groups 34B as the inversion targets of which one or more of the positions in the first direction 32A is different between the division data 40A and the division data 40B. The alteration processing unit 20B selects each second data group 34B, which is the inversion target, by using a numerical value output from the random number generator or the like.

For example, the alteration processing unit 20B selects, as the inversion targets, the second data groups 34B (second data group 34B1 and second data group 34B3) on the first and third columns in the division data 40A, as illustrated in FIG. 10. Then, the alteration processing unit 20B inverts the respective pieces of binary data of the selected second data group 34B1 and second data group 34B3. Specifically, the alteration processing unit 20B inverts "1" to "0" and inverts "0" to "1" for the pieces of binary data included in each of the selected second data group 34B1 and second data group 34B3. With this inversion processing, the alteration processing unit 20B generates altered data 53A from the division data 40A. The altered data 53A is an example of altered data 50 obtained by executing the alteration processing on the division data 40A.

Furthermore, the alteration processing unit 20B selects, as the inversion targets, the second data groups 34B (second data group 34B2 and second data group 34B3) on the second and third columns in the division data 40B, as illustrated in FIG. 10. Then, the alteration processing unit 20B inverts the respective pieces of binary data of the selected second data group 34B2 and second data group 34B3. Specifically, the alteration processing unit 20B inverts "1" to "0" and inverts "0" to "1" for the pieces of binary data included in each of the selected second data group 34B2 and second data group 34B3. With this inversion processing, the alteration processing unit 20B generates altered data 53B from the division data 40B. The altered data 53B is an example of altered data 50 obtained by executing the alteration processing on the division data 40B.

The transmission unit 20C transmits the altered data 53A and the altered data 53B obtained by the alteration processing to the analysis device 12A and the analysis device 12B, respectively. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combined the altered data 53A and the altered data 53B. However, the altered data 53A and the altered data 53B have been subjected to the alteration processing in the mutually different manners. That is, the altered data 53A and the altered data 53B are different from each other in one or more of the positions in the first direction 32A of the second data groups 34B that are the inversion targets, between the pieces of division data 40. Thus, the company B and the company C are difficult to restore the original data 30 from the altered data 53A and the altered data 53B. Therefore, the information processing apparatus 10 can inhibit the leakage of confidentiality.

Second Inversion Processing

Next, second inversion processing will be described. The second inversion processing involves inverting the respective values of the pieces of binary data of at least one first data group 34A included in each piece of division data 40.

Figure 11:
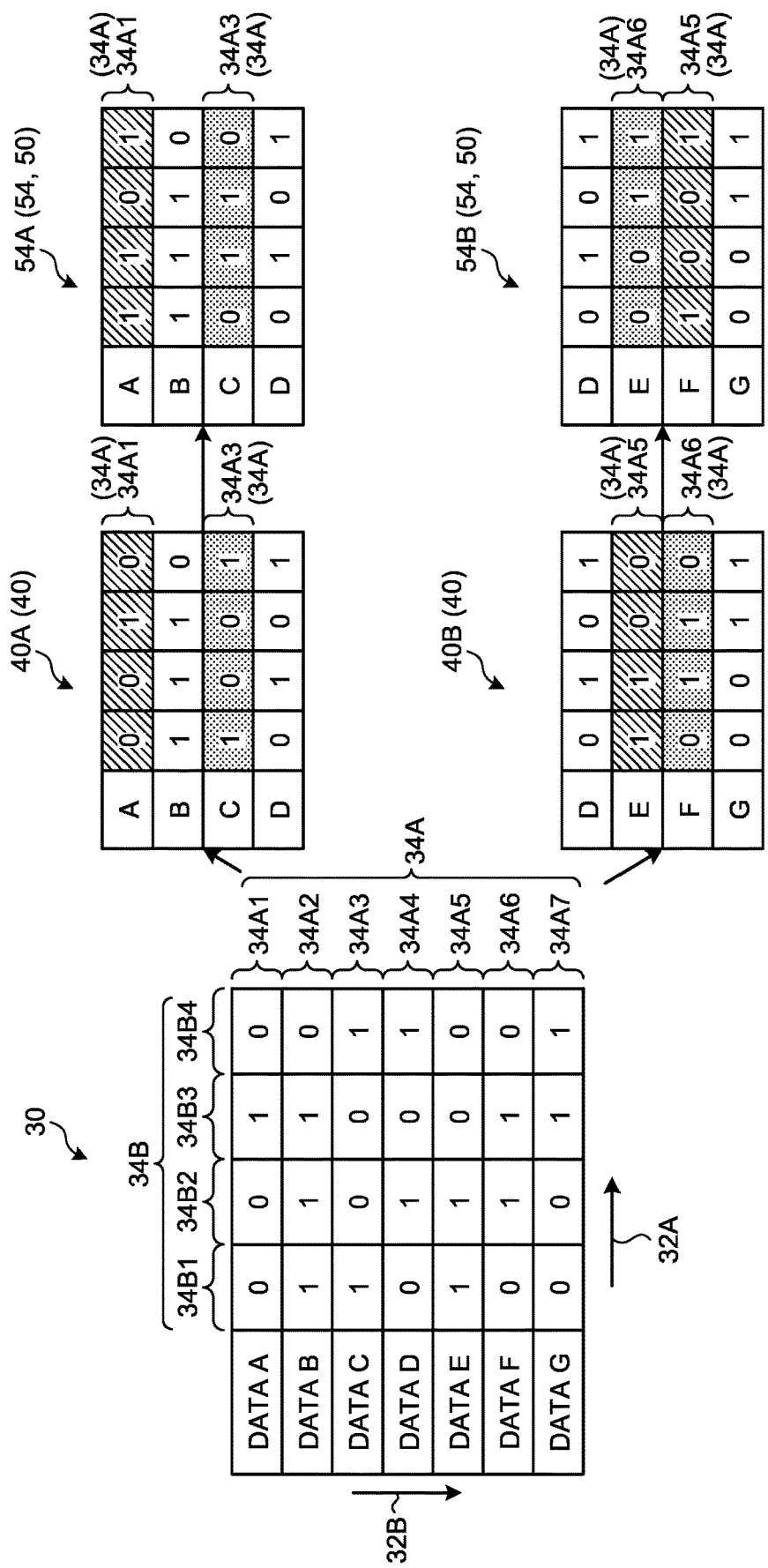
FIG. 11 explanatorily illustrates second inversion processing according to the embodiment.

FIG. 11 explanatorily illustrates an example of the second inversion processing. The alteration processing unit 20B selects a first data group 34A as an inversion target, in each of the division data 40A and the division data 40B. At this time, the alteration processing unit 20B selects one or more first data groups 34A as the inversion targets of which one or more of the positions in the second direction 32B is different between the division data 40A and the division data 40B. The alteration processing unit 20B selects each first data group 34A, which is the inversion target, by using a numerical value output from the random number generator or the like.

For example, the alteration processing unit 20B selects, as the inversion targets, the first data groups 34A (first data group 34A1 and first data group 34A3) on the first and third rows in the division data 40A, as illustrated in FIG. 11. Then, the alteration processing unit 20B inverts the respective pieces of binary data of the selected first data group 34A1 and first data group 34A3. Specifically, the alteration processing unit 20B inverts "1" to "0" and inverts "0" to "1" for the pieces of binary data included in each of the selected first data group 34A1 and first data group 34A3. With this inversion processing, the alteration processing unit 20B generates altered data 54A from the division data 40A. The altered data 54A is an example of altered data 50 obtained by executing the alteration processing on the division data 40A.

Furthermore, the alteration processing unit 20B selects, as the inversion targets, the first data groups 34A (first data group 34A5 and first data group 34A6) on the second and third rows in the division data 40B, as illustrated in FIG. 11. Then, the alteration processing unit 20B inverts the respective pieces of binary data of the selected first data group 34A5 and first data group 34A6. Specifically, the alteration processing unit 20B inverts "1" to "0" and inverts "0" to "1" for the pieces of binary data included in each of the selected first data group 34A5 and first data group 34A6. With this inversion processing, the alteration processing unit 20B generates altered data 54B from the division data 40B. The altered data 54B is an example of altered data 50 obtained by executing the alteration processing on the division data 40B.

The transmission unit 20C transmits the altered data 54A and the altered data 54B obtained by the alteration processing to the analysis device 12A and the analysis device 12B, respectively. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combined the altered data 54A and the altered data 54B. However, the altered data 54A and the altered data 54B have been subjected to the alteration processing in the mutually different manners. That is, the altered data 54A and the altered data 54B are different from each other in one or more of the positions in the second direction 32B of the first data groups 34A that are the inversion targets, between the pieces of division data 40. Thus, the company B and the company C are difficult to restore the original data 30 from the altered data 54A and the altered data 54B. Therefore, the information processing apparatus 10 can inhibit the leakage of confidentiality.

Note that, in a case where the alteration processing unit 20B has executed, as the alteration processing, one or more of the first inversion processing and the second inversion processing, the analysis result obtained from each analysis device 12 becomes the same value as the analysis result of the corresponding division data 40. Therefore, in this case, the information processing apparatus 10 can achieve both inhibition of the leakage of confidentiality and inhibition of the deterioration in accuracy of the analysis results.

It is assumed that each analysis device 12 analyzes the corresponding altered data 50 by using, for example, hierarchical clustering or non-hierarchical clustering.

Figure 12:
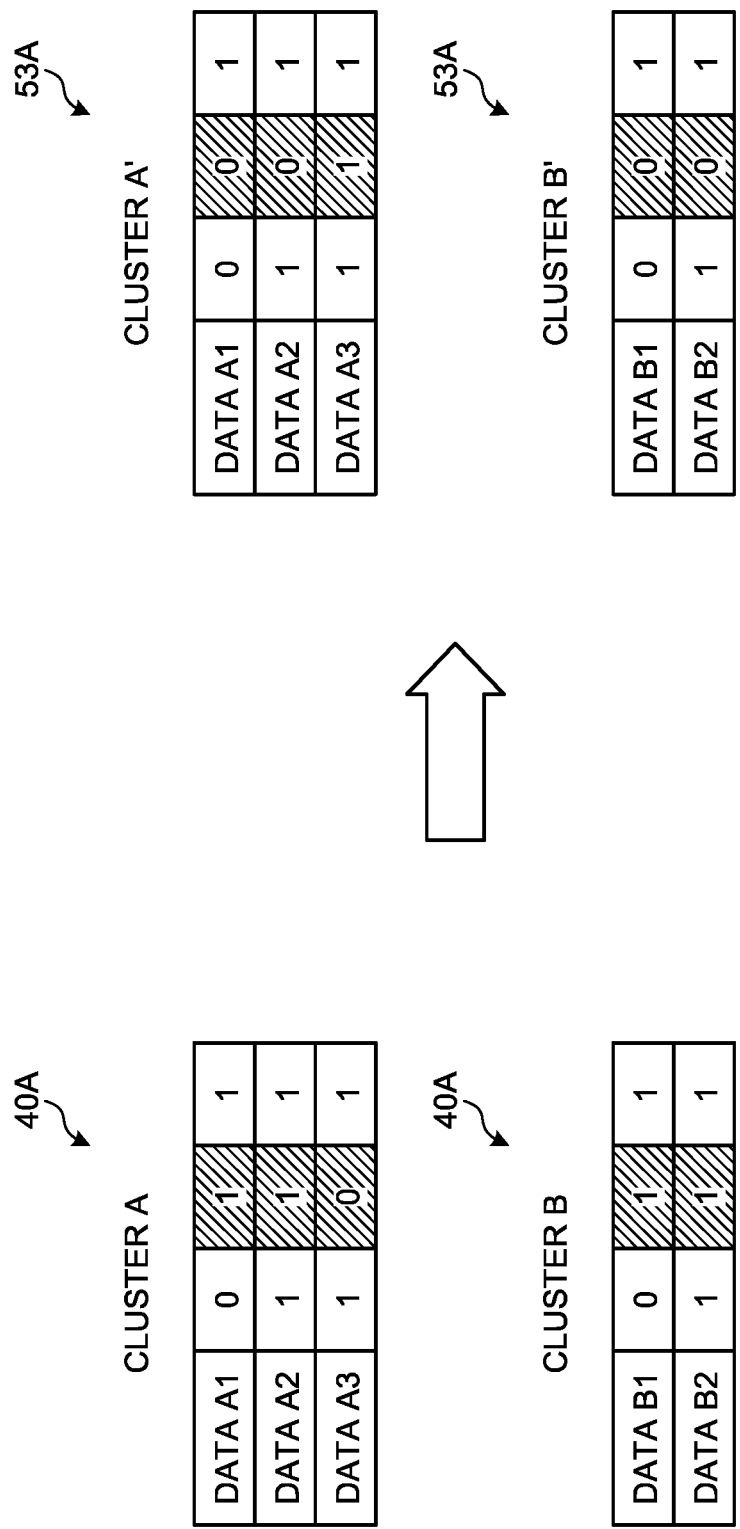
FIG. 12 explanatorily illustrates analysis by the analysis device according to the embodiment.

FIG. 12 explanatorily illustrates an example of the analysis by the analysis device 12. It is assumed that the analysis device 12 analyzes the corresponding altered data 50 by using, for example, agglomerative clustering that is an example of the hierarchical clustering.

The center of gravity $m_A$ of the cluster A of the pieces of data A1 to A3 included in the division data 40A is expressed by Expression (7) below, for example. Furthermore, the center of gravity $m_B$ of the cluster B of the pieces of data B1 to B2 included in the division data 40A is expressed by Expression (8) below. Furthermore, the distance $d(m_A, m_B)^2$ between the cluster A and the cluster B in the division data 40A is expressed by Expression (9) below.

$$m_A = \left(\frac{2}{3}, \frac{2}{3}, 1\right) \quad (7)$$

$$m_B = \left(\frac{1}{2}, 1, 1\right) \quad (8)$$

$$d(m_A, m_B)^2 = \left(\frac{1}{2} - \frac{1}{3}\right)^2 + \left((1) + \left(\frac{2}{3}\right)\right)^2 + (1-1)^2 \quad (9)$$

Meanwhile, the center of gravity $m_A'$ of the cluster A' of the pieces of data A1 to A3 included in the altered data 53A is expressed by Expression (10) below. Furthermore, the center of gravity $m_B'$ of the cluster B' of the pieces of data B1 to B2 included in the altered data 53A is expressed by Expression (11) below. Still furthermore, the distance $d(m_A', m_B')^2$ between the cluster A' and the cluster B' in the altered data 53A is expressed by Expression (12) below.

$$m_A' = \left(\frac{2}{3}, \frac{1}{3}, 1\right) = \left(\frac{2}{3}, 1 - \frac{2}{3}, 1\right) \quad (10)$$

$$m_B' = \left(\frac{1}{2}, 0, 1\right) = \left(\frac{1}{2}, 1 - 1, 1\right) \quad (11)$$

$$d(m_A', m_B')^2 = \left(\frac{1}{2} - \frac{2}{3}\right)^2 + \left((1-1) - \left(1 - \frac{2}{3}\right)\right)^2 + (1-1)^2 \quad (12)$$

As shown in Expression (9) and Expression (12), the same value can be obtained from: the distance $d(m_A, m_B)^2$ between the cluster A and the cluster B calculated on the division data 40A; and the distance $d(m_A', m_B')^2$ between the cluster A' and the cluster B' calculated on the altered data 53A. Therefore, the analysis result obtained from the division data 40 and the analysis result obtained from the altered data 53 are the same analysis result.

A similar result can be obtained in a case where the altered data 54 generated by the first inversion processing is used instead of the altered data 53 generated by the second inversion processing.

Thus, in a case where the alteration processing unit 20B has executed, as the alteration processing, one or more of the first inversion processing and the second inversion processing, the analysis result obtained from each analysis device 12 becomes the same value as the analysis result of the corresponding division data 40. Therefore, in this case, the information processing apparatus 10 can achieve both inhibition of the leakage of confidentiality and inhibition of the deterioration in accuracy of the analysis results.

Third Inversion Processing

Next, third inversion processing will be described. The third inversion processing involves inverting the respective values of the pieces of binary data of each second data group 34B included in each piece of division data 40, with probability represented by a predetermined probability distribution.

Figure 13:
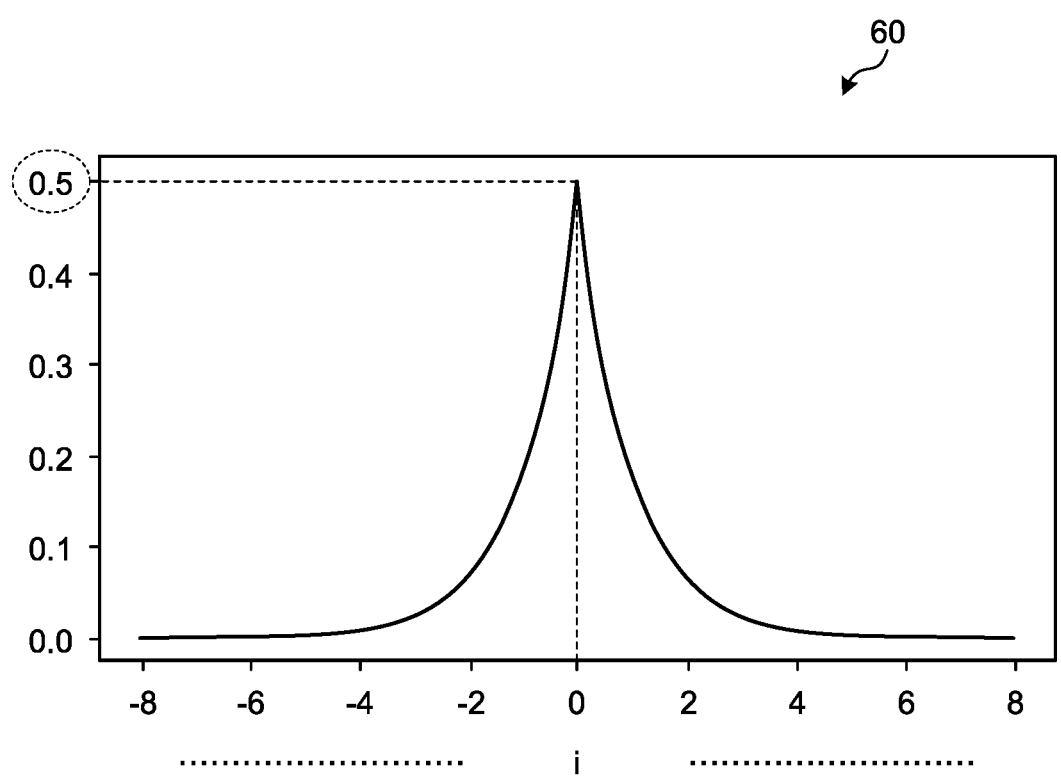
FIG. 13 is a schematic graph of a probability distribution according to the embodiment.

FIG. 13 is a schematic graph of an example of a probability distribution 60. The probability distribution 60 is data representing the position in the second direction 32B and the probability of inverting the pieces of binary data at each position. That is, in FIG. 13, the horizontal axis "i" represents the position in the second direction 32B, and the vertical axis represents the probability. FIG. 13 illustrates, as an example, the probability distribution 60 represented by a probability density function of Laplace distribution in which the probability parameter is set to 0.5 and the position parameter is set to 0.

The probability distribution 60 is stored in advance for each second data group 34B. Note that the probability distributions 60 corresponding one-to-one to the plurality of second data groups 34B are at least partially different from each other.

The alteration processing unit 20B reads out, from the storage unit 22, the probability distributions 60 corresponding one-to-one to the plurality of second data groups 34B included in the division data 40A. Then, the alteration processing unit 20B sequentially inverts the pieces of binary data with the probability represented by the corresponding probability distribution 60 for each of the second data groups 34B included in the division data 40A. Note that the alteration processing unit 20B may select, as inversion targets, some of the second data groups 34B included in the division data 40A. Alternatively, the alteration processing unit 20B may select, as an inversion target, partial data in a second data group 34B included in the division data 40A. Then, the alteration processing unit 20B may sequentially invert the pieces of binary data for each selected second data group 34B with the probability represented by the corresponding probability distribution 60.

Similarly, the alteration processing unit 20B reads out, from the storage unit 22, the probability distributions 60 corresponding one-to-one to the plurality of second data groups 34B included in the division data 40B. Then, the alteration processing unit 20B sequentially inverts the pieces of binary data with the probability represented by the corresponding probability distribution 60 for each of the second data groups 34B included in the division data 40B.

The division data 40A and the division data 40B are inverted by using the probability distributions 60 at least partially different from each other. Note that the alteration processing unit 20B may select some of the second data groups 34B as inversion targets, instead of all the second data groups 34B included in the division data 40B. Alternatively, the alteration processing unit 20B may select, as an inversion target, partial data in a second data group 34B included in the division data 40B. Then, the alteration processing unit 20B may sequentially invert the pieces of binary data for each selected second data group 34B with the probability represented by the corresponding probability distribution 60.

In this manner, the alteration processing unit 20B may generate each piece of altered data 50 by inverting, with the probability represented by the predetermined probability distribution, the respective values of the pieces of binary data of each second data group 34B included in the corresponding division data 40.

Similarly, the transmission unit 20C transmits each piece of altered data 50 obtained by the third inversion processing to the corresponding analysis device 12. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combined each piece of altered data 50 acquired from the information processing apparatus 10. However, the altered data 50 acquired by the analysis device 12A and the altered data 50 acquired by the analysis device 12B have been subjected to the alteration processing in the mutually different manners. That is, the altered data 50 acquired by the analysis device 12A and the altered data 50 acquired by the analysis device 12B are data generated by executing the inversion processing in accordance with the probability distributions 60 at least partially different from each other. Thus, the company B and the company C are difficult to restore the original data 30 from these pieces of altered data 50. Therefore, the information processing apparatus 10 can inhibit the leakage of confidentiality.

Fourth Inversion Processing

Next, fourth inversion processing will be described. The fourth inversion processing involves inverting, with probability represented by a predetermined probability distribution 60, the respective values of the pieces of binary data of each first data group 34A included in each piece of division data 40.

That is, in the case of the fourth inversion processing, the horizontal axis "i" of the probability distribution 60 represented in FIG. 13 represents the position in the first direction 32A. The vertical axis represents the probability similarly to the third inversion processing.

In the case of the fourth inversion processing, it is sufficient that the probability distribution 60 is stored in advance in the storage unit 22 for each first data group 34A. Note that the probability distributions 60 corresponding one-to-one to the plurality of first data groups 34A are at least partially different from each other.

The alteration processing unit 20B reads out, from the storage unit 22, the probability distributions 60 corresponding one-to-one to the plurality of first data groups 34A included in the division data 40A. Then, the alteration processing unit 20B sequentially inverts the pieces of binary data with the probability represented by the probability distribution 60 corresponding to each of the first data groups 34A included in the division data 40A. Note that the alteration processing unit 20B may select, as inversion targets, some of the first data groups 34A included in the division data 40A. Alternatively, the alteration processing unit 20B may select, as an inversion target, partial data in a first data group 34A included in the division data 40A. Then, the alteration processing unit 20B may sequentially invert the pieces of binary data for each selected first data group 34A with the probability represented by the corresponding probability distribution 60.

Similarly, the alteration processing unit 20B reads out, from the storage unit 22, the probability distributions 60 corresponding one-to-one to the plurality of first data groups 34A included in the division data 40B. Then, the alteration processing unit 20B sequentially inverts the pieces of binary data with the probability represented by the corresponding probability distribution 60 for each of the first data groups 34A included in the division data 40B.

Between the division data 40A and the division data 40B, each piece of the division data (40A, 40B) includes a non-overlap with one another. Therefore, the division data 40A and the division data 40B are inverted by using the probability distributions 60 at least partially different from each other. Note that the alteration processing unit 20B may select, as inversion targets, some of the first data groups 34A included in the division data 40B. Alternatively, the alteration processing unit 20B may select, as an inversion target, partial data in a first data group 34A included in the division data 40B. Then, the alteration processing unit 20B may sequentially invert the pieces of binary data for each selected first data group 34A with the probability represented by the corresponding probability distribution 60.

In this manner, the alteration processing unit 20B may generate each piece of altered data 50 by inverting, with the probability represented by the predetermined probability distribution, the respective values of the pieces of binary data of each first data group 34A included in the corresponding division data 40.

Similarly, the transmission unit 20C transmits each piece of altered data 50 obtained by the alteration processing to the corresponding analysis device 12. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combined each piece of altered data 50 acquired from the information processing apparatus 10. However, the altered data 50 acquired by the analysis device 12A and the altered data 50 acquired by the analysis device 12B have been subjected to the alteration processing in the mutually different manners. That is, the altered data 50 acquired by the analysis device 12A and the altered data 50 acquired by the analysis device 12B are data generated by executing the inversion processing in accordance with the probability distributions 60 at least partially different from each other. Thus, the company B and the company C are difficult to restore the original data 30 from these pieces of altered data 50. Therefore, the information processing apparatus 10 can inhibit the leakage of confidentiality.

Thinning Processing

Next, thinning processing will be described. The thinning processing involves thinning at least either one or more of the first data groups 34A or one or more of second data groups 34B, from each piece of division data 40. Thinning means removal or deletion from each piece of division data 40.

Figure 14:
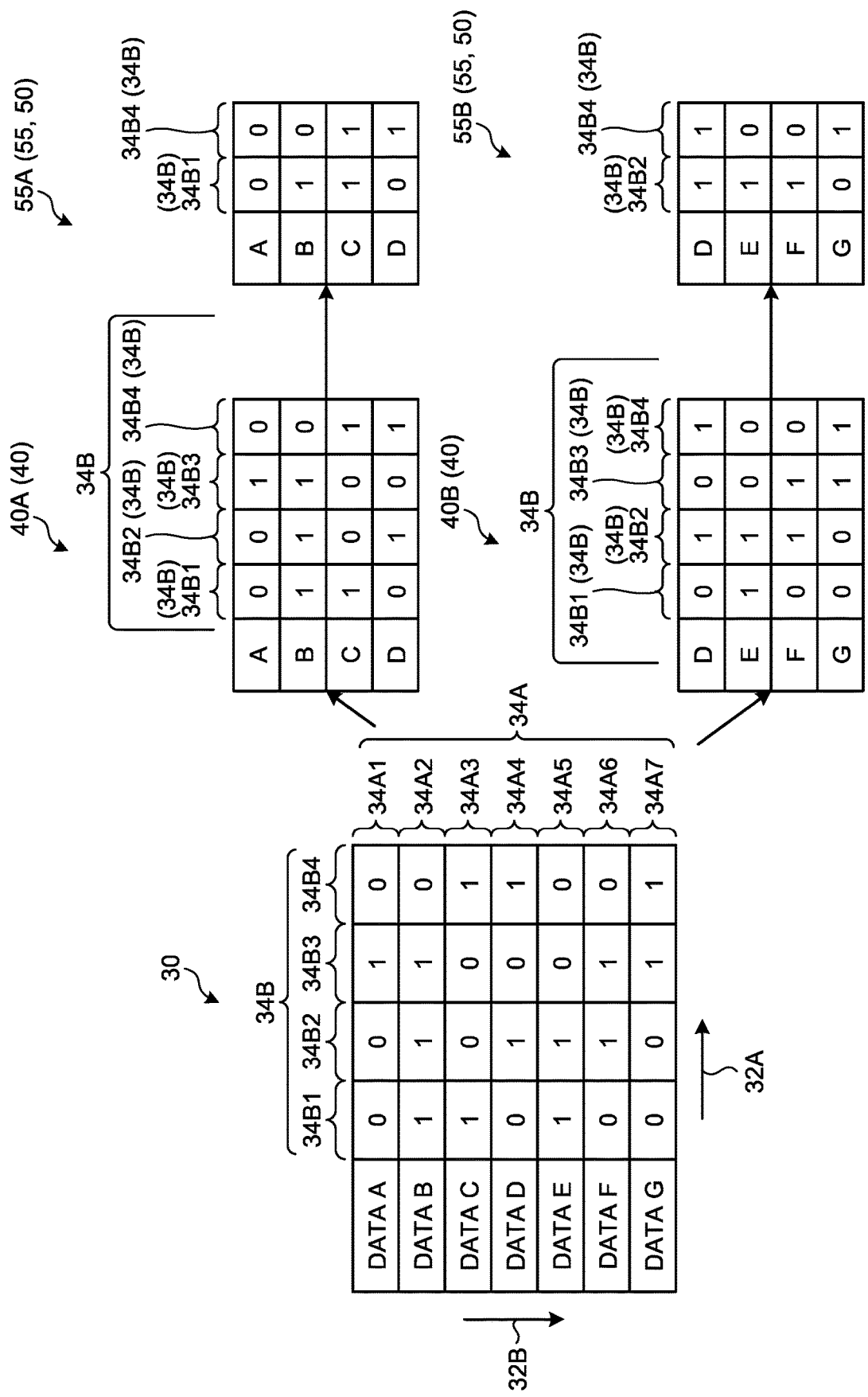
FIG. 14 explanatorily illustrates thinning processing according to the embodiment.

FIG. 14 explanatorily illustrates an example of the thinning processing. The alteration processing unit 20B selects a second data group 34B and/or a first data group 34A, each being a thinning target in each of the division data 40A and the division data 40B. Here, there will be exemplarily described a case where the second data group 34B is selected as a thinning target. In this case, the alteration processing unit 20B selects one or more second data groups 34B as the thinning targets of which one or more of the positions in the first direction 32A is different between the division data 40A and the division data 40B. For example, the alteration processing unit 20B selects each second data group 34B as the thinning target by using a numerical value output from the random number generator or the like.

For example, the alteration processing unit 20B selects, as the thinning targets, the second data groups 34B (second data group 34B2 and second data group 34B3) on the second and third columns in the division data 40A, as illustrated in FIG. 14. Then, the alteration processing unit 20B removes the selected second data group 34B2 and second data group 34B3 from the division data 40A, thereby generating altered data 55A. The altered data 55A is an example of altered data 50.

Furthermore, the alteration processing unit 20B selects, as the thinning targets, the second data groups 34B (second data group 34B1 and second data group 34B3) on the first and third columns in the division data 40B, as illustrated in FIG. 14. Then, the alteration processing unit 20B removes the selected second data group 34B1 and second data group 34B3 from the division data 40B, thereby generating altered data 55B. The altered data 55B is an example of altered data 50.

Similarly, the transmission unit 20C transmits the altered data 55A and the altered data 55B obtained by the alteration processing to the analysis device 12A and the analysis device 12B, respectively. Each of the analysis device 12A and the analysis device 12B analyzes the altered data 50 received from the information processing apparatus 10, and transmits the analysis result to the information processing apparatus 10.

Here, it is assumed that the company B managing the analysis device 12A and the company C managing the analysis device 12B have colluded with each other and combine the altered data 55A and the altered data 55B. However, the altered data 55A and the altered data 55B have been subjected to the alteration processing in the mutually different manners. That is, the altered data 55A and the altered data 55B are different in position in the first direction 32A of the second data groups 34B that are the thinning targets, between the pieces of division data 40. Thus, the company B and the company C are difficult to restore the original data 30 from the altered data 55A and the altered data 55B. Therefore, the information processing apparatus 10 can inhibit the leakage of confidentiality.

Note that the alteration processing unit 20B may select, as a thinning target, a first data group 34A in each of the division data 40A and the division data 40B. In this case, the alteration processing unit 20B selects one or more first data groups 34A as the thinning targets of which one or more of the positions in the second direction 32B is different between the division data 40A and the division data 40B. For example, the alteration processing unit 20B selects each first data group 34A that is the thinning target, with a numerical value output from the random number generator or the like. Then, the alteration processing unit 20B generates altered data 50 by thinning the selected first data group 34A from the division data 40A. Similarly, the alteration processing unit 20B generates altered data 50 by thinning the selected first data group 34A from the division data 40B.

Alternatively, the alteration processing unit 20B may thin one or more of the first data groups 34A and one or more of the second data groups 34B included in each piece of division data 40, thereby generating altered data 50.

It is assumed that the alteration processing unit 20B has executed one or more of the third inversion processing, the fourth inversion processing, and the thinning processing, as the alteration processing. In addition, it is assumed that each analysis device 12 analyzes the corresponding altered data 50 by using hierarchical clustering. In this case, it is considered that the analysis result obtained from the analysis device 12 has a value similar to the analysis result of the corresponding division data 40, by transmission of the altered data 50 to the analysis device 12. Therefore, in this case, the information processing apparatus 10 can inhibit the leakage of confidentiality while inhibiting the deterioration in accuracy of the analysis results.

Alteration Processing in Combination

Note that it is sufficient that the alteration processing unit 20B executes alteration processing in mutually different manners on the plurality of pieces of division data 40, the mutually different manners corresponding one-to-one to the plurality of pieces of division data 40. Therefore, it is sufficient that the alteration processing unit 20B executes, as the alteration processing, one or more of the first replacement processing, the second replacement processing, the first inversion processing, the second inversion processing, the third inversion processing, the fourth inversion processing, and the thinning processing described above. Alternatively, the alteration processing unit 20B may execute, as the alteration processing, processing in combination of two or more of the first replacement processing, the second replacement processing, the first inversion processing, the second inversion processing, the third inversion processing, the fourth inversion processing, and the thinning processing. Alternatively, for each of the plurality of pieces of division data 40, the alteration processing unit 20B may execute the alteration processing different in one or more of a combination of the first replacement processing, the second replacement processing, the first inversion processing, the second inversion processing, the third inversion processing, the fourth inversion processing, and the thinning processing; the number of repetitions; and the processing order.

Next, an exemplary flow of information processing executed by the information processing apparatus 10 will be described.

Figure 15:
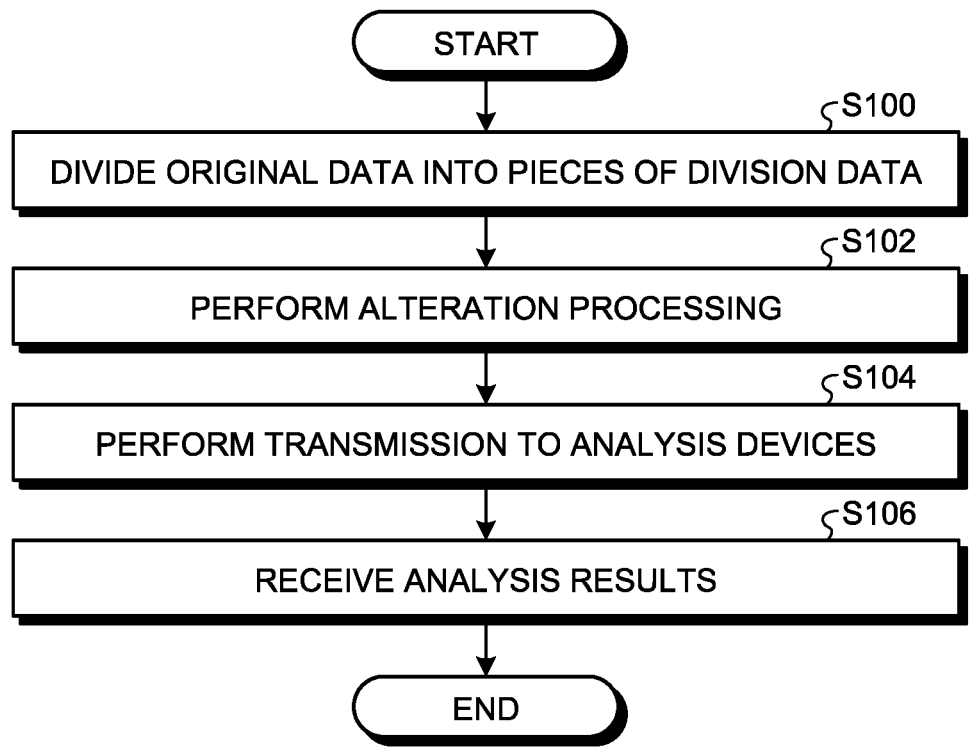
FIG. 15 is a flowchart of the flow of information processing according to the embodiment.

FIG. 15 is a flowchart of the exemplary flow of the information processing executed by the information processing apparatus 10.

First, the division unit 20A divides original data 30 into a plurality of pieces of division data 40 (Step S100).

The alteration processing unit 20B executes alteration processing in mutually different manners on the plurality of pieces of division data 40, the mutually different manners corresponding one-to-one to the plurality of pieces of division data 40 (Step S102). The processing in Step S102 generates, for the analysis devices 12, a plurality of pieces of altered data 50 having been subjected to the alteration processing in the mutually different manners the plurality of pieces of altered data 50 corresponding one-to-one to the plurality of analysis devices 12.

The transmission unit 20C transmits each of the pieces of altered data 50 generated in Step S102 to the corresponding analysis device 12 (Step S104).

After that, the reception unit 20D receives the analysis results of the altered data 50 from the plurality of analysis devices 12 (Step S106). The reception unit 20D stores the received analysis results in the storage unit 22. Note that the reception unit 20D may output the analysis results to the UI unit 26. Then, this routine ends.

As described above, the information processing apparatus 10 of the present embodiment includes the division unit 20A and the alteration processing unit 20B. The division unit 20A divides the original data 30 into the plurality of pieces of division data 40. Each piece of the division data 40 includes a non-overlap with one another. The alteration processing unit 20B executes the alteration processing in the mutually different manners on the plurality of pieces of division data 40, the mutually different manners corresponding one-to-one to the plurality of pieces of division data 40.

In this manner, the information processing apparatus 10 according to the present embodiment divides the original data 30 into the plurality of pieces of division data 40, each piece of the division data 40 including a non-overlap with one another, and then executes the alteration processing in the mutually different manners on the plurality of pieces of division data 40, the mutually different manners corresponding one-to-one to the plurality of pieces of division data 40.

Therefore, the leakage of confidentiality can be inhibited by transmitting the plurality of pieces of altered data 50 generated by executing the alteration processing in the mutually different manners on the plurality of pieces of division data 40, one-to-one to the analysis devices 12 mutually different. Even in the case where the respective managers of the plurality of analysis devices 12 collude with each other and combine each piece of altered data 50 transmitted to the plurality of analysis devices 12, it is difficult to restore the original data 30 because the plurality of pieces of altered data 50 have been subjected to the alteration processing in the mutually different manners.

Therefore, the information processing apparatus 10 of the present embodiment can inhibit the leakage of confidentiality.

Modification

In the above embodiment, there has been exemplarily described that the division unit 20A divides the original data 30 into the plurality of pieces of division data 40, and the alteration processing unit 20B executes the alteration processing in the mutually different manners on the plurality of pieces of division data 40 that is divided.

Alternatively, the alteration processing unit 20B may execute alteration processing in mutually different manners on the original data 30, and then the division unit 20A may execute dividing processing.

In this case, it is sufficient that the alteration processing unit 20B executes the alteration processing in the mutually different manners on the original data 30 and generates a plurality of pieces of altered data having been subjected to the alteration processing in the mutually different manners, the plurality of pieces of altered data one-to-one corresponding to the number of analysis devices 12 to which analysis is requested. The alteration processing is similar to those in the above embodiment. In the present modification, there will be exemplarily described a case where the number of analysis devices 12 to which analysis is requested is two of the analysis device 12A and the analysis device 12B, similarly to the above embodiment.

The division unit 20A divides each of the plurality of pieces of altered data into a plurality of pieces of division data, each piece of the division data including a non-overlap with one another. Then, it is sufficient that the transmission unit 20C transmits, to the analysis device 12A, division data that is part of the plurality of pieces of division data obtained by dividing the altered data having been subjected to the alteration processing for the analysis device 12A. Furthermore, it is sufficient that the transmission unit 20C transmits, to the analysis device 12B, division data that is part of the plurality of pieces of division data obtained by dividing the altered data having been subjected to the alteration processing for the analysis device 12B and that is different from the division data transmitted to the analysis device 12A, in at least some of the positions in the original data 30.

In this manner, also in the case where the division unit 20A executes the dividing processing after the alteration processing on the original data 30 by the alteration processing unit 20B, effects similar to those in the above embodiment can be obtained.

Next, an exemplary hardware configuration of the information processing apparatus 10 in the above embodiment and modification will be described.

Figure 16:
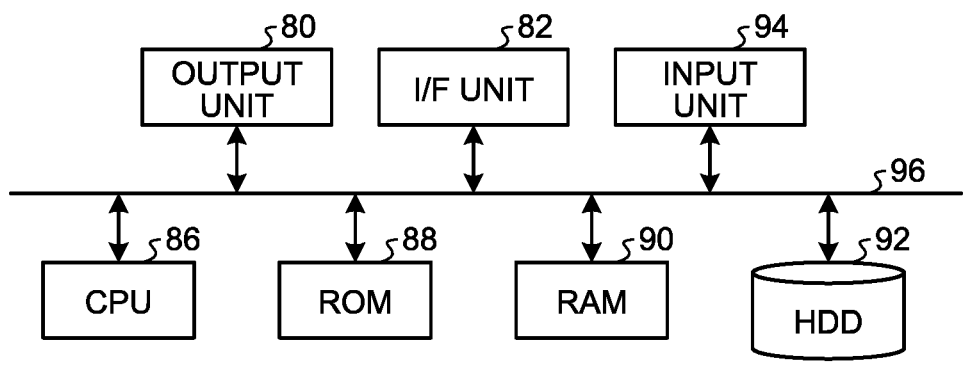
FIG. 16 is a hardware configuration diagram of the information processing apparatus according to the embodiment.

FIG. 16 is an exemplary hardware configuration diagram of the information processing apparatus 10 according to the above embodiment and modification.

The information processing apparatus 10 includes a control device such as a CPU 86; a storage device such as a read only memory (ROM) 88, a random access memory (RAM) 90, and a hard disk drive (HDD) 92; an interface (I/F) unit 82 that is an interface with various types of equipment; an output unit 80 that outputs various types of information such as output information; an input unit 94 that receives operations by the user; and a bus 96 that connects each of the units, the information processing apparatus 10 having a hardware configuration using a general computer.

In the information processing apparatus 10, the CPU 86 reads a program from the ROM 88 onto the RAM 90 and executes the program, thereby implementing each of the above units on the computer.

Note that a program for executing each piece of the above processing to be executed by the information processing apparatus 10 may be stored in advance in the HDD 92. Alternatively, the program for executing each piece of the above processing to be executed by the information processing apparatus 10 may be provided in advance by being built in the ROM 88.

Further alternatively, the program for executing the above processing to be executed by the information processing apparatus 10 may be a file in installable or executable format stored in a computer-readable storage medium such a CD-ROM, a CD-R, a memory card, a digital versatile disk (DVD), or a flexible disk (FD), and may be provided as a computer program product. Alternatively, the program for executing the above processing to be executed by the information processing apparatus 10 may be stored on a computer in connection with a network such as the Internet, and may be provided by being downloaded via the network. Alternatively, the program for executing the above processing to be executed by the information processing apparatus 10 may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer program product comprising a non-transitory computer-readable recording medium on which an executable program is recorded, the program instructing the computer to:

receive an operation instruction by a user regarding a number of divisions of original data, the original data including a plurality of first data groups of which each includes a set of pieces of binary data arrayed in a line in a first direction and which are arrayed in a second direction intersecting with the first direction, the original data including a plurality of second data groups obtained by dividing the plurality of first data groups in the second direction in unit of binary data, the plurality of second data groups each including a set of pieces of binary data arrayed in a line in the second direction, and the plurality of first data groups and the plurality of second data groups representing same data in two data formats;

divide the plurality of first data groups into a plurality of pieces of division data of the number of divisions, one of the plurality of pieces of division data partially overlapping with another of the plurality of pieces of division data, a number of the plurality of first data groups being larger than the number of divisions of the original data; and execute alteration processing in mutually different manners on the plurality of pieces of division data, alteration processing on the one of the plurality of pieces of division data being different from alteration processing on the other of the plurality of pieces of division data, wherein the program instructs the computer to execute, in each of the plurality of pieces of division data, the alteration processing individually on at least either the first data groups or the second data groups, the alteration processing includes at least one of:
  first replacement processing of replacing positions in the first direction of two or more of the second data groups included in each of the plurality of pieces of division data;
  second replacement processing of replacing positions in the second direction of two or more of the first data groups included in each of the plurality of pieces of division data;
  first inversion processing of inverting respective values of the pieces of binary data of one or more of the second data groups included in each of the plurality of pieces of division data;
  second inversion processing of inverting respective values of the pieces of binary data of one or more of the first data groups included in each of the plurality of pieces of division data;
  third inversion processing of inverting, with probability corresponding to a predetermined probability distribution, respective values of the pieces of binary data of the second data groups included in each of the plurality of pieces of division data;
  fourth inversion processing of inverting, with probability corresponding to a predetermined probability distribution, respective values of the pieces of binary data of the first data groups included in each of the plurality of pieces of division data; or
  thinning processing of thinning one or more of the first data groups or one or more of the second data groups included in each of the plurality of pieces of division data, and the alteration processing on the first data groups or the second data groups included in the one of the plurality of pieces of division data is different from the alteration processing on the first data groups or the second data groups included in the other of the plurality of pieces of division data.

2. The product according to claim 1, wherein the program further instructs the computer to transmit, to mutually different analysis devices, a plurality of pieces of altered data that are the pieces of division data on which the mutually different alteration processing has been executed.

3. The product according to claim 1, wherein the program instructs the computer to execute, as the alteration processing, processing obtained by combining two or more of the first replacement processing, the second replacement processing, the first inversion processing, the second inversion processing, the third inversion processing, the fourth inversion processing, and the thinning processing.

4. The product according to claim 1, wherein the program instructs the computer to execute, on each of the plurality of pieces of division data, the alteration processing different in one or more of: a combination of the first replacement processing, the second replacement processing, the first inversion processing, the second inversion processing, the third inversion processing, the fourth inversion processing, and the thinning processing; a number of repetitions; and a processing order.

5. The product according to claim 1, wherein the program instructs the computer to execute, on each of the plurality of pieces of division data, the alteration processing of executing the thinning processing after the first replacement processing is executed.

6. A computer program product comprising a non-transitory computer-readable recording medium on which an executable program is recorded, the program instructing the computer to:
receive an operation instruction by a user regarding a number of divisions of original data, the original data including a plurality of first data groups of which each includes a set of pieces of binary data arrayed in a line in a first direction and which are arrayed in a second direction intersecting with the first direction, the original data including a plurality of second data groups obtained by dividing the plurality of first data groups in the second direction in unit of binary data, the plurality of second data groups each including a set of pieces of binary data arrayed in a line in the second direction, and the plurality of first data groups and the plurality of second data groups representing same data in two data formats;
execute alteration processing in mutually different manners on the original data to generate a plurality of pieces of altered data each having a same data format as that of the original data; and
divide the plurality of first data groups of each of the plurality of pieces of altered data into a plurality of pieces of division data of the number of divisions, one of the plurality of pieces of division data partially overlapping with another of the plurality of pieces of division data, a number of the plurality of first data groups being larger than the number of divisions, wherein
the program instructs the computer to execute, in each of the plurality of pieces of division data, the alteration processing individually on at least either the first data groups or the second data groups, and
the alteration processing includes at least one of:
first replacement processing of replacing positions in the first direction of two or more of the second data groups included in each of the plurality of pieces of division data;
second replacement processing of replacing positions in the second direction of two or more of the first data groups included in each of the plurality of pieces of division data;
first inversion processing of inverting respective values of the pieces of binary data of one or more of the second data groups included in each of the plurality of pieces of division data;
second inversion processing of inverting respective values of the pieces of binary data of one or more of the first data groups included in each of the plurality of pieces of division data;
third inversion processing of inverting, with probability corresponding to a predetermined probability distribution, respective values of the pieces of binary data of the second data groups included in each of the plurality of pieces of division data;
fourth inversion processing of inverting, with probability corresponding to a predetermined probability distribution, respective values of the pieces of binary data of the first data groups included in each of the plurality of pieces of division data; or
thinning processing of thinning one or more of the first data groups or one or more of the second data groups included in each of the plurality of pieces of division data.

7. The product according to claim 6, wherein the program instructs the computer to execute, as the alteration processing, processing obtained by combining two or more of the first replacement processing, the second replacement processing, the first inversion processing, the second inversion processing, the third inversion processing, the fourth inversion processing, and the thinning processing.

8. The product according to claim 6, wherein the program instructs the computer to execute, on each of the plurality of pieces of division data, the alteration processing different in one or more of: a combination of the first replacement processing, the second replacement processing, the first inversion processing, the second inversion processing, the third inversion processing, the fourth inversion processing, and the thinning processing; a number of repetitions; and a processing order.

9. The product according to claim 6, wherein the program instructs the computer to execute, on each of the plurality of pieces of division data, the alteration processing of executing the thinning processing after the first replacement processing is executed.

10. A computer program product comprising a non-transitory computer-readable recording medium on which an executable program is recorded, the program instructing the computer to:
execute alteration processing in mutually different manners on original data to generate a plurality of pieces of altered data each having a same data format as that of the original data, the original data including a plurality of first data groups of which each includes a set of pieces of binary data arrayed in a line in a first direction and which are arrayed in a second direction intersecting with the first direction, the original data including a plurality of second data groups obtained by dividing the plurality of first data groups in the second direction in unit of binary data, the plurality of second data groups each including a set of pieces of binary data arrayed in a line in the second direction, and the plurality of first data groups and the plurality of second data groups representing same data in two data formats;

divide the plurality of first data groups of each of the plurality of pieces of altered data into a plurality of pieces of division data of a number of divisions, one of the plurality of pieces of division data partially overlapping with another of the plurality of pieces of division data, a number of the plurality of first data groups being larger than the number of divisions; and transmit, to a first analysis device, division data that is part of the plurality of pieces of division data obtained by dividing the altered data having been subjected to alteration processing for the first analysis device, and transmit, to a second analysis device, division data whose position of at least part in the original data is different from the division data transmitted to the first analysis device, wherein the program further instructs the computer to execute, in each of the plurality of pieces of division data, the alteration processing individually on at least either the first data groups or the second data groups, and the alteration processing includes at least one of:
  first replacement processing of replacing positions in the first direction of two or more of the second data groups included in each of the plurality of pieces of division data;
  second replacement processing of replacing positions in the second direction of two or more of the first data groups included in each of the plurality of pieces of division data;
  first inversion processing of inverting respective values of the pieces of binary data of one or more of the second data groups included in each of the plurality of pieces of division data;
  second inversion processing of inverting respective values of the pieces of binary data of one or more of the first data groups included in each of the plurality of pieces of division data;
  third inversion processing of inverting, with probability corresponding to a predetermined probability distribution, respective values of the pieces of binary data of the second data groups included in each of the plurality of pieces of division data;
  fourth inversion processing of inverting, with probability corresponding to a predetermined probability distribution, respective values of the pieces of binary data of the first data groups included in each of the plurality of pieces of division data; or
  thinning processing of thinning one or more of the first data groups or one or more of the second data groups included in each of the plurality of pieces of division data.

11. The product according to claim 10, wherein the program instructs the computer to execute, as the alteration processing, processing obtained by combining two or more of the first replacement processing, the second replacement processing, the first inversion processing, the second inversion processing, the third inversion processing, the fourth inversion processing, and the thinning processing.

12. The product according to claim 10, wherein the program instructs the computer to execute, on each of the plurality of pieces of division data, the alteration processing different in one or more of: a combination of the first replacement processing, the second replacement processing, the first inversion processing, the second inversion processing, the third inversion processing, the fourth inversion processing, and the thinning processing; a number of repetitions; and a processing order.

13. The product according to claim 10, wherein the program instructs the computer to execute, on each of the plurality of pieces of division data, the alteration processing of executing the thinning processing after the first replacement processing is executed.

* * * * *